US012722693B2

(12) United States Patent
Tamura et al.

(10) Patent No.: US 12,722,693 B2
(45) Date of Patent: Sep. 1, 2026

(54) STEERING APPARATUS FOR INDUSTRIAL VEHICLE

(71) Applicant: KABUSHIKI KAISHA TOYOTA JIDOSHOKKI, Kariya (JP)

(72) Inventors: Kengo Tamura, Kariya (JP); Akihito Nibe, Kariya (JP)

(73) Assignee: KABUSHIKI KAISHA TOYOTA JIDOSHOKKI, Kariya (JP)

( * ) Notice: Subject to any disclaimer, the term of this patent is extended or adjusted under 35 U.S.C. 154(b) by 397 days.

(21) Appl. No.: 18/284,440

(22) PCT Filed: Mar. 15, 2022

(86) PCT No.: PCT/JP2022/011734
§ 371 (c)(1),
(2) Date: Sep. 27, 2023

(87) PCT Pub. No.: WO2022/209874
PCT Pub. Date: Oct. 6, 2022

(65) Prior Publication Data

US 2024/0166256 A1 May 23, 2024

(30) Foreign Application Priority Data

Mar. 29, 2021 (JP) ................................ 2021-054936
Mar. 29, 2021 (JP) ................................ 2021-054939

(51) Int. Cl.
*B62D 5/09* (2006.01)
*B62D 5/04* (2006.01)
(Continued)

(52) U.S. Cl.
CPC ........... *B62D 5/093* (2013.01); *B62D 5/0475* (2013.01); *B62D 5/063* (2013.01); *B62D 5/075* (2013.01)

(58) Field of Classification Search
CPC ...... B62D 5/093; B62D 5/0475; B62D 5/063; B62D 5/075; B62D 1/22
See application file for complete search history.

(56) References Cited

U.S. PATENT DOCUMENTS 10,808,733 B2 10/2020 Knight et al.
2015/0175194 A1* 6/2015 Gattis ................. G05D 1/0061 701/41

(Continued)

FOREIGN PATENT DOCUMENTS

JP 51-007632 A 1/1976
JP 07-132841 A 5/1995

(Continued)

OTHER PUBLICATIONS

International Search Report for PCT/JP2022/011734 dated May 17, 2022 [PCT/ISA/210].

(Continued)

*Primary Examiner* — Valentin Neacsu
*Assistant Examiner* — Marlon A Arce
(74) *Attorney, Agent, or Firm* — Sughrue Mion, PLLC

(57) ABSTRACT

A steering apparatus for an industrial vehicle includes: a manual steering circuit which includes a first valve opened/closed according to an operation of a steering wheel and supplies hydraulic oil discharged from a hydraulic pump to a steering cylinder through the first valve; an automatic steering circuit which includes a second valve opened/closed according to a calculation result of automatic operation control and supplies the hydraulic oil discharged from the hydraulic pump to the steering cylinder through the second valve; and a branching valve which is disposed between the hydraulic pump and the first and second valves and branches the hydraulic oil to the manual steering circuit and the automatic steering circuit. The branching valve is a priority valve which preferentially supplies the hydraulic oil to the (Continued)

manual steering circuit at a designed flow rate equal to or larger than a predetermined flow rate for operating the steering cylinder.

9 Claims, 15 Drawing Sheets

(51) Int. Cl.
*B62D 5/06* (2006.01)
*B62D 5/07* (2006.01)
*B62D 5/093* (2006.01)

(56) References Cited

U.S. PATENT DOCUMENTS

2016/0039452 A1* 2/2016 Rotole .................. B62D 11/24
180/414
2017/0297617 A1* 10/2017 Petersen .................. B62D 1/22
2018/0186402 A1 7/2018 Irie
2019/0241212 A1* 8/2019 Pedersen ................ B62D 5/093

FOREIGN PATENT DOCUMENTS

JP 09-254801 A 9/1997
JP 10-157643 A 6/1998
JP 2004-224218 A 8/2004
KR 10-2021-0077386 A 6/2021
WO 2016/208530 A1 12/2016
WO 2019/146957 A1 8/2019

OTHER PUBLICATIONS

Extended European Search Report dated Sep. 5, 2024 in Application No. 22780094.3.
International Report on Patentability (and translation of Written Opinion) dated Oct. 3, 2023 in Application No. PCT/JP2022/011734.

* cited by examiner 100A
1A
2
3
21
GNSS RECEIVER
40
50
32
30
STEERING HYDRAULIC CIRCUIT
CONTROLLER
7b
6b
10A
9
B
6a
6c
6
4
5
7c
7
7a
Fr
L
R
Rr

Fig.2

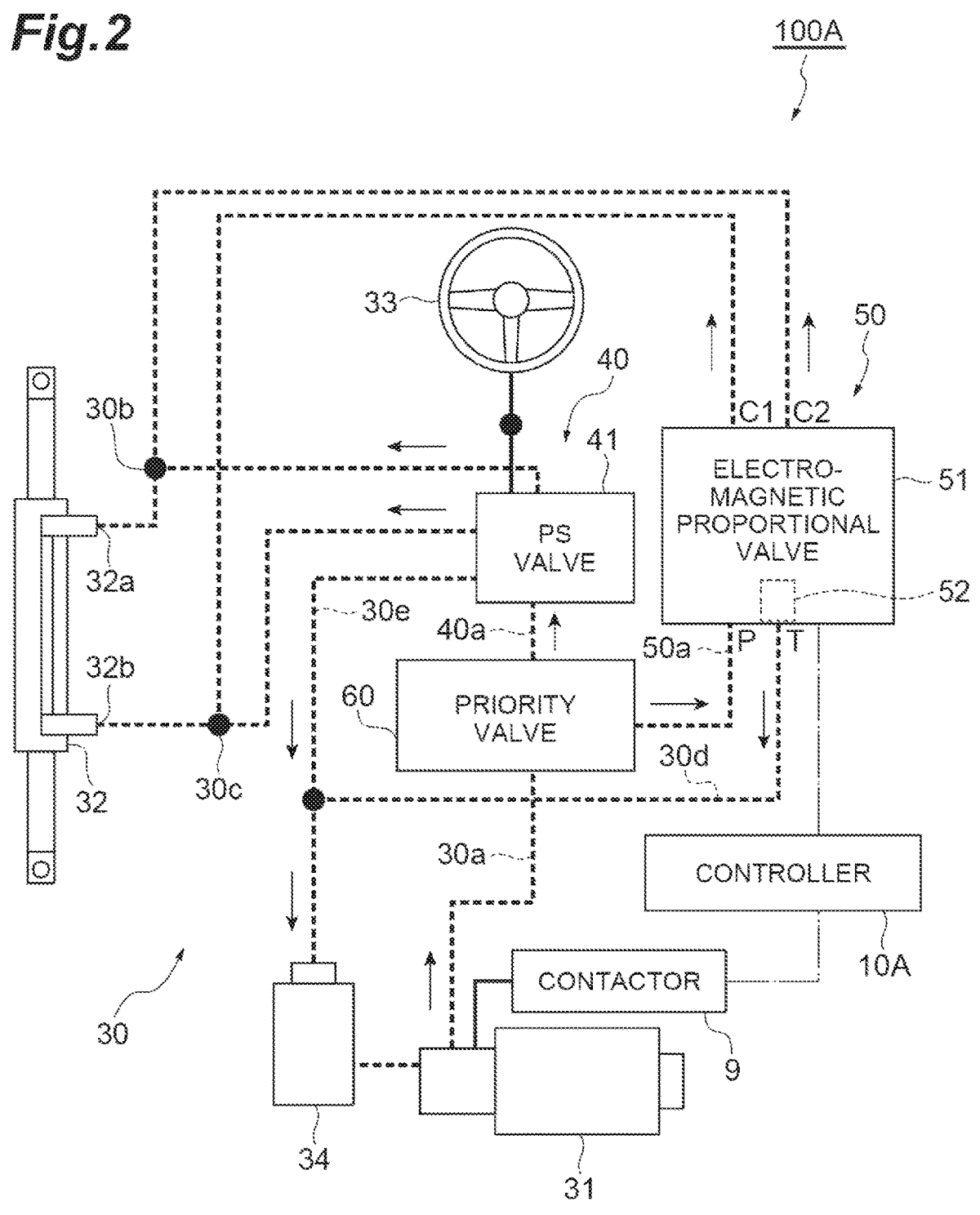

100A
33
50
40
C1
C2
30b
41
ELECTRO-MAGNETIC PROPORTIONAL VALVE
51
PS VALVE
32a
52
30e
40a
50a
P
T
32b
60
PRIORITY VALVE
32
30c
30d
30a
CONTROLLER
CONTACTOR
10A
30
9
34
31

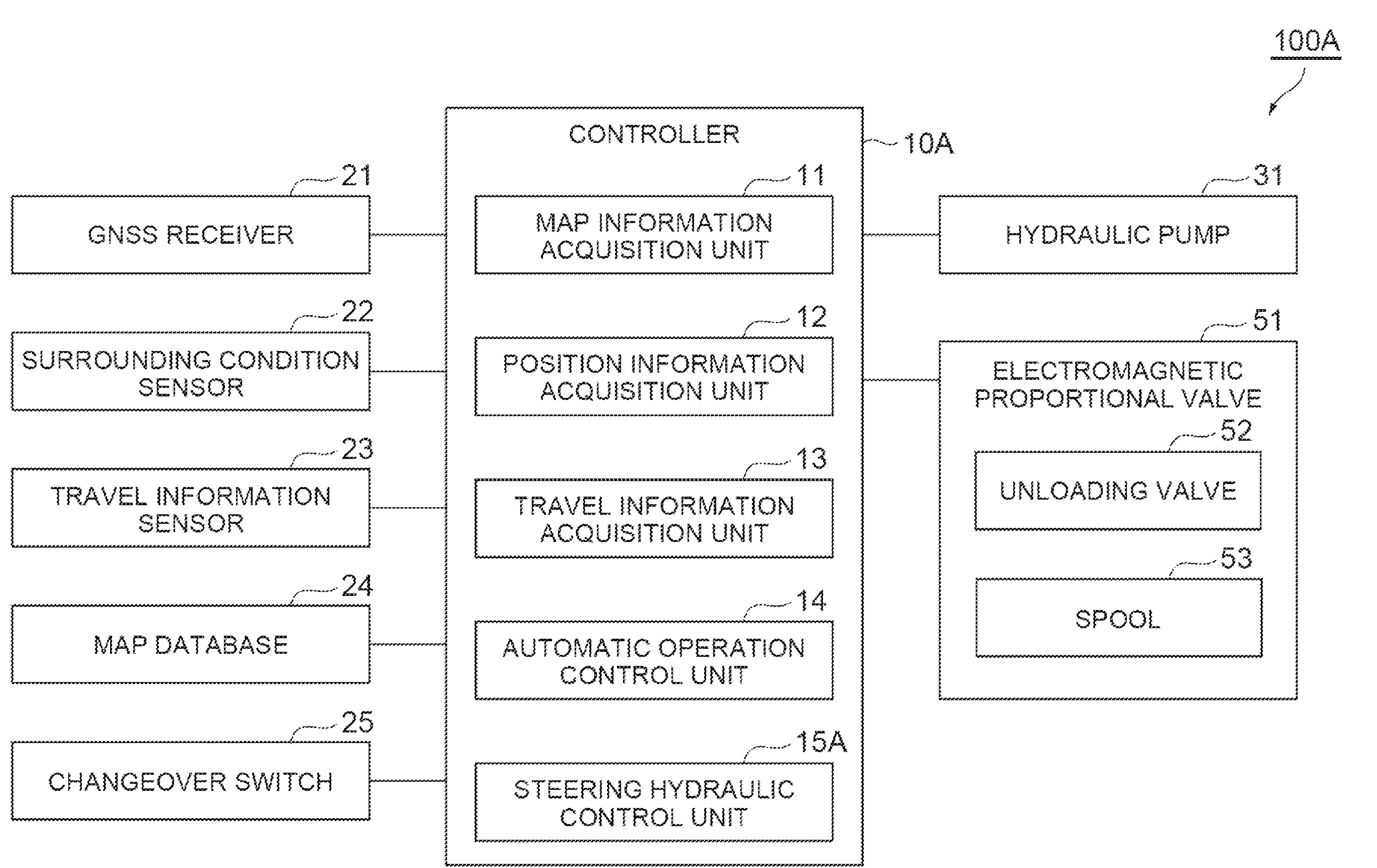
Fig.4
100A
CONTROLLER
10A
21
GNSS RECEIVER
22
SURROUNDING CONDITION SENSOR
23
TRAVEL INFORMATION SENSOR
24
MAP DATABASE
25
CHANGEOVER SWITCH
11
MAP INFORMATION ACQUISITION UNIT
12
POSITION INFORMATION ACQUISITION UNIT
13
TRAVEL INFORMATION ACQUISITION UNIT
14
AUTOMATIC OPERATION CONTROL UNIT
15A
STEERING HYDRAULIC CONTROL UNIT
31
HYDRAULIC PUMP
51
ELECTROMAGNETIC PROPORTIONAL VALVE
52
UNLOADING VALVE
53
SPOOL 60
64
62
D1
40a(40)
66
62b
68
50a(50)
62c
D2
69
61
67
30a
62a
65
63
30f 100B
1B
2
3
32
40
50
30
STEERING HYDRAULIC CIRCUIT
21
GNSS RECEIVER
CONTROLLER
10B
7b
6b
9
B
6a
6c
6
4
5
7c
7a
7
Fr
L
R
Rr

Fig.10

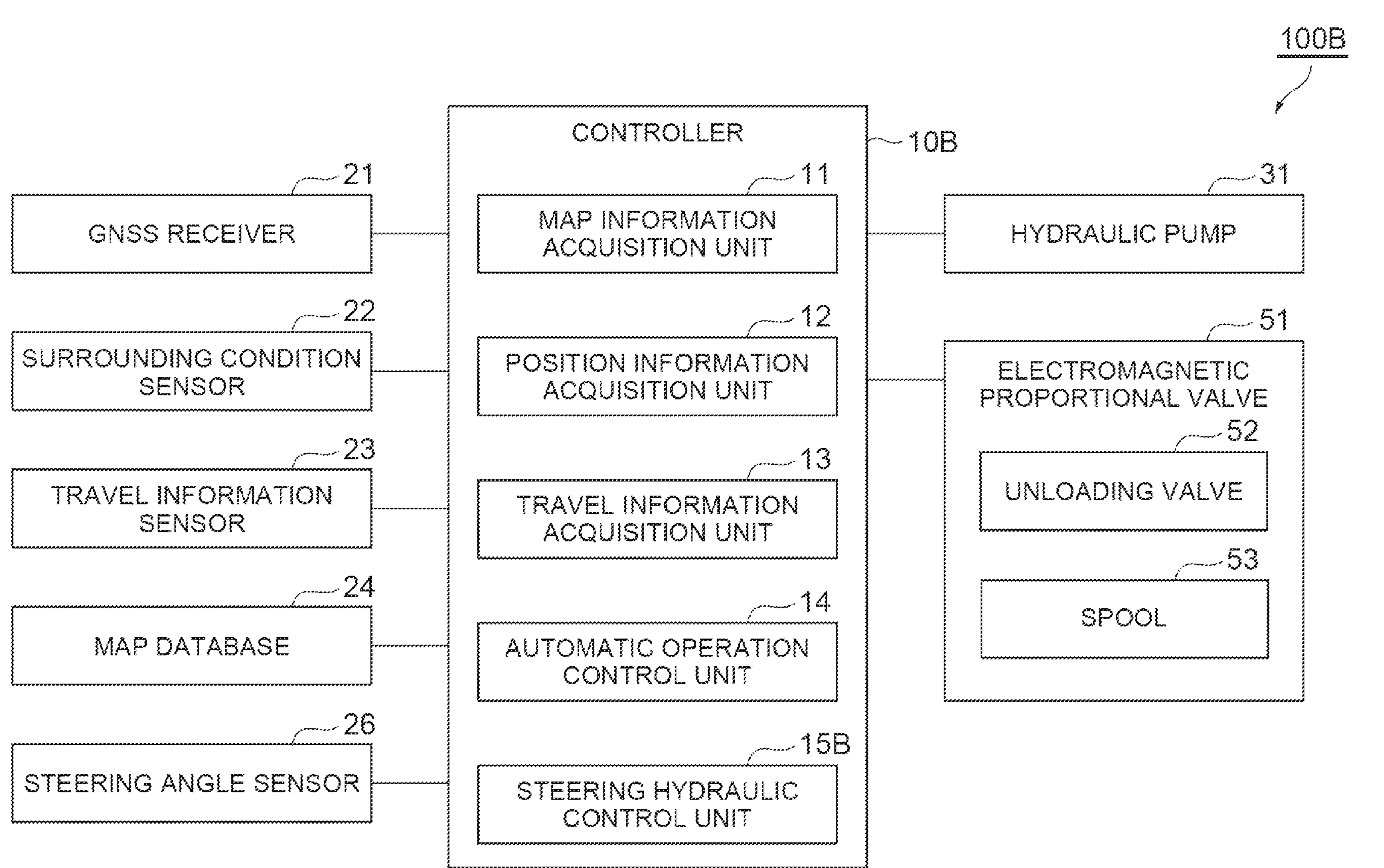
Fig.11
100B
CONTROLLER
10B
21
GNSS RECEIVER
22
SURROUNDING CONDITION SENSOR
23
TRAVEL INFORMATION SENSOR
24
MAP DATABASE
26
STEERING ANGLE SENSOR
11
MAP INFORMATION ACQUISITION UNIT
12
POSITION INFORMATION ACQUISITION UNIT
13
TRAVEL INFORMATION ACQUISITION UNIT
14
AUTOMATIC OPERATION CONTROL UNIT
15B
STEERING HYDRAULIC CONTROL UNIT
31
HYDRAULIC PUMP
51
ELECTROMAGNETIC PROPORTIONAL VALVE
52
UNLOADING VALVE
53
SPOOL

STEERING APPARATUS FOR INDUSTRIAL VEHICLE

CROSS REFERENCE TO RELATED APPLICATIONS

This application is a National Stage of International Application No. PCT/JP2022/011734 filed Mar. 15, 2022, claiming priority based on Japanese Patent Application No. 2021-054936 filed Mar. 29, 2021 and Japanese Patent Application 2021-054939 filed Mar. 29, 2021.

TECHNICAL FIELD

The present disclosure relates to a steering apparatus for an industrial vehicle.

BACKGROUND ART

Conventionally, as a technique related to a steering apparatus for an industrial vehicle, there is known a vehicle steering control apparatus that selectively switches between a manual steering mode and an automatic steering mode by hydraulic switching means using a directional switching valve (for example, Patent Literature 1).

CITATION LIST

Patent Literature

Patent Literature 1: Japanese Unexamined Patent Publication No. H9-254801

SUMMARY OF INVENTION

Technical Problem

In the manual steering mode, the vehicle steering control apparatus of the above-described conventional technique is operated as a hydraulic reaction force type power steering apparatus in which hydraulic pressure is evenly supplied to both of a pair of hydraulic chambers. In the automatic steering mode, hydraulic pressure is supplied to one of the hydraulic chambers according to the steering direction by switching control of the directional switching valve, and automatic steering is executed. In such a configuration, since the manual steering mode and the automatic steering mode are selectively switched when switching the directional switching valve, it is difficult to allow a hydraulic circuit to function according to the manual steering of the operator, for example, in the automatic steering mode.

An object of the present disclosure is to provide a steering apparatus for an industrial vehicle capable of allowing a hydraulic circuit to function so that manual steering is available even when automatic steering is available.

Solution to Problem

A steering apparatus for an industrial vehicle according to an aspect of the present disclosure is a steering apparatus for an industrial vehicle including a hydraulic pump discharging hydraulic oil and a steering cylinder operated by the hydraulic oil supplied thereto to steer a steered wheel, the steering apparatus for the industrial vehicle including: a manual steering circuit which includes a first valve opened or closed according to an operation of a steering wheel and supplies the hydraulic oil discharged from the hydraulic pump to the steering cylinder through the first valve; an automatic steering circuit which includes a second valve opened or closed according to a calculation result of automatic operation control and supplies the hydraulic oil discharged from the hydraulic pump to the steering cylinder through the second valve; and a branching valve which is disposed between the hydraulic pump and the first and second valves and branches the hydraulic oil to the manual steering circuit and the automatic steering circuit. The branching valve is a priority valve which preferentially supplies the hydraulic oil to the manual steering circuit at a designed flow rate equal to or larger than a predetermined flow rate for operating the steering cylinder.

In the steering apparatus for the industrial vehicle according to an aspect of the present disclosure, the hydraulic oil is branched to the manual steering circuit and the automatic steering circuit by the branching valve. The branching valve is a priority valve which preferentially supplies the hydraulic oil to the manual steering circuit at a designed flow rate equal to or larger than a predetermined flow rate for operating the steering cylinder. Accordingly, since at least the hydraulic oil of the predetermined flow rate is supplied to the manual steering circuit even when the second valve is opened according to the calculation result of the automatic operation control, it is possible to operate the steering cylinder according to the operation of the steering wheel. Thus, according to the steering apparatus for the industrial vehicle of an aspect of the present disclosure, it is possible to allow the hydraulic circuit to function so that the manual steering is available even when the automatic steering is available.

In one aspect, the steering apparatus for the industrial vehicle may further include unloading means for decreasing a pressure of the hydraulic oil supplied from the hydraulic pump and applied to the second valve compared to a case in which a predetermined automatic steering non-operation condition for suspending the supply of the hydraulic oil through the second valve is not satisfied, when the automatic steering non-operation condition is satisfied. In this case, an unnecessary load is applied to the hydraulic pump since the pressure of the hydraulic oil from the hydraulic pump is always applied to the second valve, for example, assuming that the hydraulic oil of the excess flow rate supplied to the automatic steering circuit is not returned to the tank when the branching valve is configured so that the supply of the hydraulic oil to the second valve is not always completely interrupted. Here, it is possible to suppress an unnecessary load from being applied to the hydraulic pump by decreasing the pressure of the hydraulic oil supplied from the hydraulic pump and applied to the second valve by the unloading means when the automatic steering non-operation condition is satisfied. As a result, it is possible to suppress the operation time of the steering apparatus for the industrial vehicle from being shortened due to the unnecessary load applied to the hydraulic pump.

In one aspect, the unloading means may include a control unit configured to determine whether or not the automatic steering non-operation condition is satisfied based on execution or non-execution information of the automatic operation control or vehicle speed information of the industrial vehicle and an unloading valve which is provided to be capable of decreasing the pressure of the hydraulic oil supplied from the hydraulic pump and applied to the second valve based on a determination result of the control unit. The control unit may be configured to control the unloading valve to decrease the pressure of the hydraulic oil supplied from the hydraulic pump and applied to the second valve when it is determined that the automatic steering non-operation condition is satisfied. In this case, it is possible to decrease the pressure of the hydraulic oil supplied from the hydraulic pump and applied to the second valve when the automatic steering non-operation condition is satisfied by controlling the unloading valve based on the determination result of the control unit.

In one aspect, the unloading means may include a control unit configured to determine whether or not the automatic steering non-operation condition is satisfied based on execution or non-execution information of the automatic operation control or vehicle speed information of the industrial vehicle, and a variable displacement pump which is the hydraulic pump configured to be capable of changing a hydraulic oil discharge amount during operation based on a determination result of the control unit. The control unit may be configured to control the variable displacement pump to decrease the hydraulic oil discharge amount when it is determined that the automatic steering non-operation condition is satisfied. In this case, it is possible to decrease the pressure of the hydraulic oil supplied from the variable displacement pump and applied to the second valve, when the automatic steering non-operation condition is satisfied, by controlling the discharge amount during the operation of the variable displacement pump based on the determination result of the control unit.

In one aspect, the control unit may be configured to determine that the automatic steering non-operation condition is satisfied when the state of a switch for switching the execution or non-execution of the automatic operation control is the automatic operation control non-execution state based on a signal from the switch. In this case, it is possible to suppress an unnecessary load from being applied to the hydraulic pump when the automatic operation control is not executed and the automatic steering is not executed.

In one aspect, the control unit may be configured to determine whether or not the industrial vehicle has been stopped continuously for a predetermined time based on vehicle speed information of the industrial vehicle and determine that the automatic steering non-operation condition is satisfied when it is determined that the industrial vehicle has been stopped continuously for a predetermined time. In this case, it is possible to suppress an unnecessary load from being applied to the hydraulic pump while the industrial vehicle has been stopped continuously for a predetermined time.

A steering apparatus for an industrial vehicle according to another aspect of the present disclosure is a steering apparatus for an industrial vehicle including a hydraulic pump discharging hydraulic oil and a steering cylinder operated by the hydraulic oil supplied thereto to steer a steered wheel, the steering apparatus for the industrial vehicle including: a manual steering circuit which includes a first valve opened or closed according to an operation of a steering wheel and supplies the hydraulic oil discharged from the hydraulic pump to the steering cylinder through the first valve; an automatic steering circuit which includes a second valve opened or closed according to a calculation result of automatic operation control and supplies the hydraulic oil discharged from the hydraulic pump to the steering cylinder through the second valve; a branching valve which is disposed between the hydraulic pump and the first and second valves and branches the hydraulic oil to the manual steering circuit and the automatic steering circuit; and a steering operation detection unit configured to detect the operation of the steering wheel. The branching valve is a priority valve which preferentially supplies the hydraulic oil to the manual steering circuit at a first flow rate equal to or larger than a predetermined flow rate for operating the steering cylinder in the hydraulic oil discharged from the hydraulic pump and supplies the hydraulic oil to the automatic steering circuit at a second flow rate which is an excess flow rate excluding the first flow rate in the hydraulic oil discharged from the hydraulic pump. The steering apparatus further includes supply restricting means for restricting the supply of the hydraulic oil to the steering cylinder through the automatic steering circuit when the steering operation detection unit detects the operation of the steering wheel.

In the steering apparatus for the industrial vehicle according to another aspect of the present disclosure, the branching valve supplies the hydraulic oil to the automatic steering circuit at the second flow rate when the excess flow rate occurs even when the steering wheel is operated. The supply restricting means restricts the supply of the hydraulic oil to the steering cylinder through the automatic steering circuit when the steering operation detection unit detects the operation of the steering wheel. Accordingly, when the steering wheel is operated, the operation of the steering cylinder due to the hydraulic oil supplied to the automatic steering circuit is restricted. Thus, according to the steering apparatus for the industrial vehicle of another aspect of the present disclosure, it is possible to suppress the hydraulic oil supplied through the automatic steering circuit from affecting the operation of the steering cylinder according to the operation of the steering wheel.

In one aspect, the supply restricting means may include a control unit configured to control the second valve so that the hydraulic oil from the hydraulic pump is not supplied to the steering cylinder through the second valve when the steering operation detection unit detects the operation of the steering wheel. In this case, it is possible to restrict the operation of the steering cylinder due to the hydraulic oil supplied to the automatic steering circuit by interrupting the hydraulic oil supplied to the automatic steering circuit by the second valve when the steering wheel is operated.

In one aspect, the supply restricting means may include an unloading valve which is provided to be capable of decreasing a pressure of the hydraulic oil of the automatic steering circuit and a control unit configured to control the unloading valve to decrease the pressure of the hydraulic oil of the automatic steering circuit when the steering operation detection unit detects the operation of the steering wheel. In this case, it is possible to restrict the operation of the steering cylinder due to the hydraulic oil supplied to the automatic steering circuit by decreasing the pressure of the hydraulic oil of the automatic steering circuit using the unloading valve when the steering wheel is operated.

In one aspect, the operation of the steering wheel may be a predetermined operation of the steering wheel by an operator of the industrial vehicle. The steering operation detection unit may detect the predetermined operation when a rotation speed of the steering wheel is equal to or lower than a predetermined rotation speed threshold value. Since the flow rate of the hydraulic oil to the steering cylinder through the manual steering circuit decreases as the rotation speed of the steering wheel becomes slow when the steering wheel is operated, the excess flow rate is likely to occur. Therefore, since the supply of the hydraulic oil to the steering cylinder through the automatic steering circuit is restricted by detecting the predetermined operation when the rotation speed of the steering wheel is equal to or lower than the rotation speed threshold value, it is possible to appropriately suppress the hydraulic oil supplied through the automatic steering circuit from affecting the operation of the steering cylinder according to the operation of the steering wheel.

Advantageous Effects of Invention

According to the present disclosure, the hydraulic circuit can be allowed to function so that manual steering is available even when automatic steering is available.

BRIEF DESCRIPTION OF DRAWINGS

FIG. 2 is a schematic circuit diagram showing a configuration of a steering hydraulic circuit of FIG. 1.

FIG. 4 is a block diagram showing a functional configuration of the steering apparatus for the industrial vehicle of FIG. 1.

FIG. 10 is a schematic circuit diagram showing a configuration of a steering hydraulic circuit of FIG. 9.

FIG. 11 is a block diagram showing a functional configuration of the steering apparatus for the industrial vehicle of FIG. 9.

DESCRIPTION OF EMBODIMENTS

Figure 1:
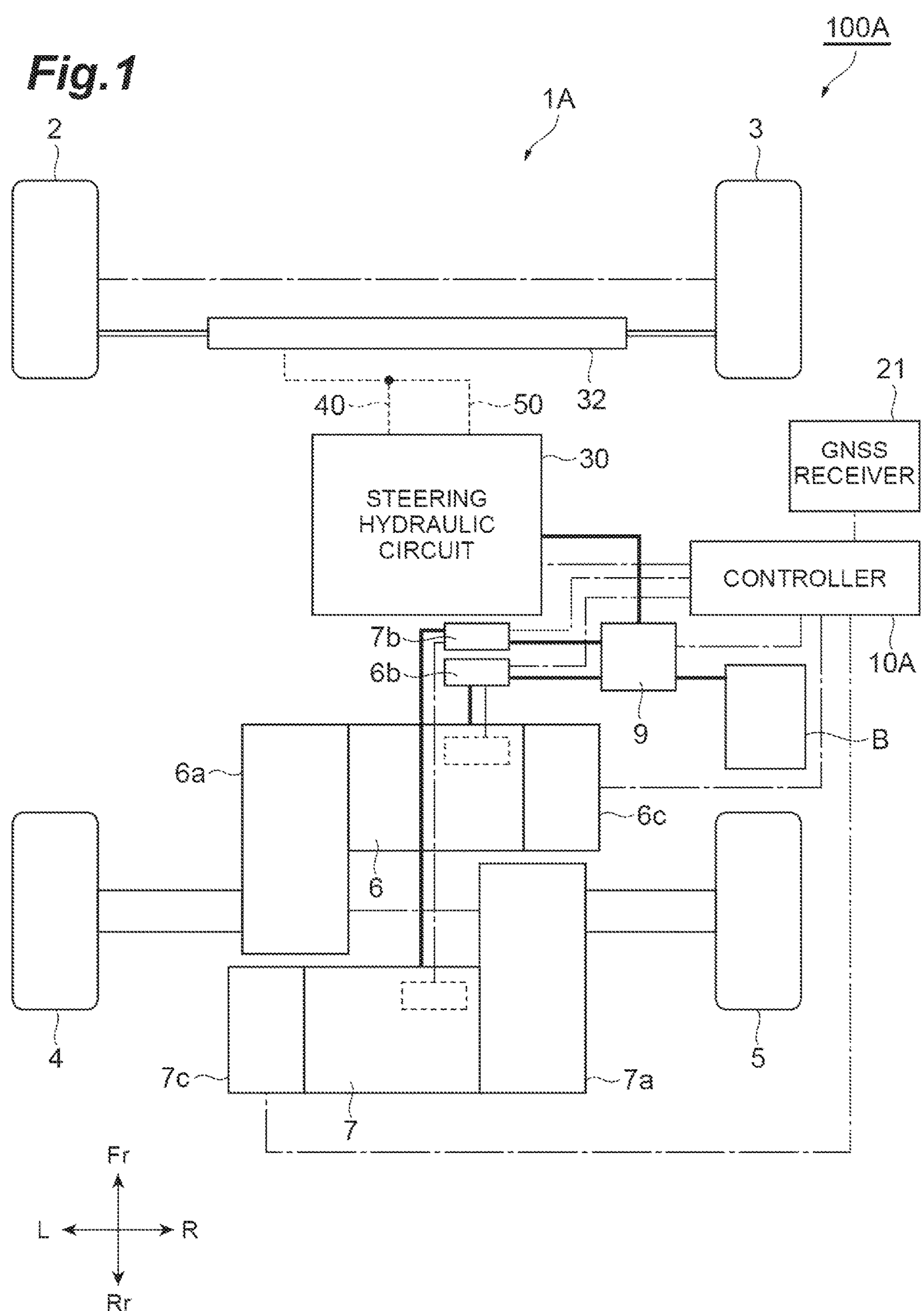
FIG. 1 is a schematic configuration diagram of an industrial vehicle to which a steering apparatus for an industrial vehicle according to a first embodiment is applied.

Hereinafter, embodiments of the present disclosure will be described in detail with reference to the drawings. In the drawings, the same or equivalent elements are denoted by the same reference numerals, and overlapping descriptions are omitted.

First Embodiment

FIG. 1 is a schematic configuration diagram of an industrial vehicle to which a steering apparatus for an industrial vehicle according to a first embodiment is applied. An industrial vehicle 1A shown in FIG. 1 is, for example, an electric towing tractor and is used to tow containers loaded with cargo at airports, factories, harbors, and the like.

The industrial vehicle 1A is configured to be capable of executing automatic operation control. The automatic operation is, for example, an operating state in which vehicle control is executed to automatically run the industrial vehicle 1A in accordance with a transportation command from an operation management system or the like. The operation management system is a so-called control system that executes the transportation command, operation monitoring, vehicle state monitoring, and the like for the industrial vehicle 1A. In the automatic operation, the industrial vehicle 1A automatically travels without the need for a worker to execute a driving operation.

The automatic operation here is executed in a predetermined area including, for example, runways, takeoff and landing areas, taxiways, aprons, control towers, hangars, cargo handling areas, and charging stations at airports. The industrial vehicle 1A can execute a predetermined automatic operation with a predetermined travel route within a predetermined area. In this embodiment, a travel plan is generated that automatically steers the industrial vehicle 1A in accordance with the calculation result of the automatic operation control, for example, at an intersection or the like on a predetermined travel route. Additionally, the travel route of the industrial vehicle 1A is not fixed and can be changed from a predetermined route. The unfixed travel route is not a travel route that is difficult to change after set once, such as an automated guided vehicle (AGV) that travels along a magnetic tape installed on a road surface, but means a travel route that is changeable by changing a travel plan generated based on map information and the like.

[Configuration Related to Traveling and Steering of Industrial Vehicle]

The industrial vehicle 1A includes an FL tire 2 and an FR tire 3 which are steered wheels arranged at a front part of a vehicle body and an RL tire 4 and an RR tire 5 which are arranged at a rear part of the vehicle body. As traveling motors, the industrial vehicle 1A includes a left traveling motor 6 which drives the RL tire 4 and a right traveling motor 7 which drives the RR tire 5. The traveling motor also functions as a braking unit 8 that generates a regenerative braking force.

The left traveling motor 6 and the right traveling motor 7 are AC motors that also function as generators. A left drive unit 6*a* is interposed between the left traveling motor 6 and the RL tire 4 as a speed reducer. A right drive unit 7*a* is interposed between the right traveling motor 7 and the RR tire 5 as a speed reducer.

The left traveling motor 6 is electrically connected to a contactor 9 through the left motor driver 6*b*. The right traveling motor 7 is electrically connected to the contactor 9 through the right motor driver 7*b*. The left motor driver 6*b* and the right motor driver 7*b* include, for example, an inverter and are electrically connected to a controller (control unit) 10A. In the left motor driver 6*b* and the right motor driver 7*b*, the power running and regenerating of the left traveling motor 6 and the right traveling motor 7 are controlled by the controller 10A.

The contactor 9 is electrically connected to a battery B and a hydraulic pump 31 of a steering hydraulic circuit (hydraulic circuit) 30. The contactor 9 is electrically connected to the controller 10A and the power supply of the battery B is controlled by the controller 10A.

The battery B is a power supply source for the left traveling motor 6, the right traveling motor 7, and the hydraulic pump 31. The battery B is composed of, for example, a lead-acid battery.

When the left traveling motor 6 is rotationally driven, the driving force of the left traveling motor 6 is transmitted to the RL tire 4 through the left drive unit 6*a* so that the RL tire 4 rotates. At the time of braking the industrial vehicle 1A, the left traveling motor 6 is operated as the generator by the rotation of the RL tire 4. When the right traveling motor 7 is rotationally driven, the driving force of the right traveling motor 7 is transmitted to the RR tire 5 through the right drive unit 7*a* so that the RR tire 5 rotates. At the time of braking the industrial vehicle 1A, the right traveling motor 7 is operated as the generator by the rotation of the RR tire 5.

The industrial vehicle 1A includes a steering apparatus 100A for an industrial vehicle. The steering apparatus 100A for the industrial vehicle is configured as a hydraulic power steering system that is operated by supplying hydraulic oil to steer the steered wheels. FIG. 2 is a schematic circuit diagram showing a configuration of the steering hydraulic circuit of FIG. 1. As shown in FIG. 2, the steering apparatus 100A for the industrial vehicle includes the contactor 9, the controller 10A, the steering hydraulic circuit 30, the hydraulic pump 31, a steering cylinder 32, and a steering wheel 33. The steering hydraulic circuit 30 is a hydraulic circuit including a manual steering circuit 40, an automatic steering circuit 50, and a priority valve 60.

The hydraulic pump 31 is a hydraulic source that discharges hydraulic oil. The hydraulic pump 31 is installed to be able to pump hydraulic oil stored in a tank 34 to a hydraulic pump circuit 30*a*. The hydraulic pump 31 is, for example, a constant displacement pump configured so that the amount of hydraulic oil discharged during operation (discharge amount at the same rotation speed) is constant. The hydraulic pump 31 is electrically connected to the contactor 9 and the number of rotations thereof is controlled by the controller 10A through the contactor 9 to control the discharge amount.

The steering cylinder 32 is operated by the hydraulic oil supplied thereto and steers the FL tire 2 and the FR tire 3 which are steered wheels. The steering cylinder 32 includes a supply port 32*a* of hydraulic oil supplied to a left cylinder to steer the FL tire 2 and a supply port 32*b* of hydraulic oil supplied to a right cylinder to steer the FR tire 3. The supply port 32*a* is connected to one junction 30*b* of the manual steering circuit 40 and the automatic steering circuit 50 through the hydraulic circuit. The supply port 32*b* is connected to the other junction 30*c* of the manual steering circuit 40 and the automatic steering circuit 50 through the hydraulic circuit.

The manual steering circuit 40 includes a PS valve (first valve) 41 which is opened or closed according to the operation of the steering wheel 33. The manual steering circuit 40 is a hydraulic circuit which supplies the hydraulic oil discharged from the hydraulic pump 31 to the steering cylinder 32 through the PS valve 41. The PS valve 41 is a so-called power steering valve.

The automatic steering circuit 50 includes an electromagnetic proportional valve (second valve) 51 which is opened or closed according to the calculation result of the automatic operation control. The automatic steering circuit 50 is a hydraulic circuit which supplies the hydraulic oil discharged from the hydraulic pump 31 to the steering cylinder 32 through the electromagnetic proportional valve 51. The electromagnetic proportional valve 51 is a so-called oil control valve. The electromagnetic proportional valve 51 here is a pilot type electromagnetic proportional valve which operates a spool 53 (see FIG. 3) therein by using the pressure of the hydraulic oil supplied from the hydraulic pump 31 and applied to the electromagnetic proportional valve 51 as a pilot pressure. For example, when the spool 53 is neutralized, the electromagnetic proportional valve 51 does not supply the hydraulic oil from the hydraulic pump 31 to the steering cylinder 32 through the electromagnetic proportional valve 51. The electromagnetic proportional valve 51 is electrically connected to the controller 10A and the opening and closing (the position of the spool 53) is controlled by the controller 10A. Additionally, in the following description, for convenience, a state in which the hydraulic oil can be supplied from the hydraulic pump 31 to the steering cylinder 32 through the electromagnetic proportional valve 51 is expressed that the "electromagnetic proportional valve 51 is open" and a state in which the hydraulic oil is not supplied from the hydraulic pump 31 to the steering cylinder 32 through the electromagnetic proportional valve 51 is expressed that the "electromagnetic proportional valve 51 is closed".

The priority valve 60 is disposed between the hydraulic pump 31 and the PS valve 41 and the electromagnetic proportional valve 51. The priority valve 60 is a branching valve which branches the hydraulic oil supplied from the hydraulic pump 31 through the hydraulic pump circuit 30*a* to the manual steering circuit 40 on the side of the PS valve 41 and the automatic steering circuit 50 on the side of the electromagnetic proportional valve 51. The details of the structure of the priority valve 60 related to branching will be described later.

In the manual steering circuit 40, the hydraulic oil of the hydraulic pump circuit 30*a* flows into the PS valve 41 through the priority valve 60 and the hydraulic oil is supplied to the junction 30*b* and the junction 30*c* through the PS valve 41 opened according to the operation of the steering wheel 33. Accordingly, the hydraulic oil is supplied to the steering cylinder 32, thereby the FL tire 2 and the FR tire 3 which are steered wheels are steered according to the operation of the steering wheel 33.

In the automatic steering circuit 50, the hydraulic oil of the hydraulic pump circuit 30*a* flows into the electromagnetic proportional valve 51 through the priority valve 60 and the hydraulic oil is supplied to the junction 30*b* and the junction 30*c* through the electromagnetic proportional valve 51 which is opened according to the calculation result of the automatic operation control. Accordingly, the hydraulic oil is supplied to the steering cylinder 32 and the FL tire 2 and the FR tire 3 which are steered wheels are steered according to the calculation result of the automatic operation control.

The electromagnetic proportional valve 51 includes an unloading valve 52 which is provided to be capable of decreasing the pressure of the hydraulic oil supplied from the hydraulic pump 31 and applied to the electromagnetic proportional valve 51 (the hydraulic oil of the automatic steering circuit 50). The unloading valve 52 is connected to the tank 34 by a return circuit 30*d*. The unloading valve 52 is electrically connected to the controller 10A. In the first embodiment, as will be described later, the unloading valve 52 decreases the pressure (that is, the pilot pressure) of the hydraulic oil supplied from the hydraulic pump 31 and applied to the electromagnetic proportional valve 51 by returning the hydraulic oil to the tank 34 through the return circuit 30*d* when the controller 10A determines that the automatic steering non-operation condition is satisfied based on the determination result of the controller 10A.

Figure 3:
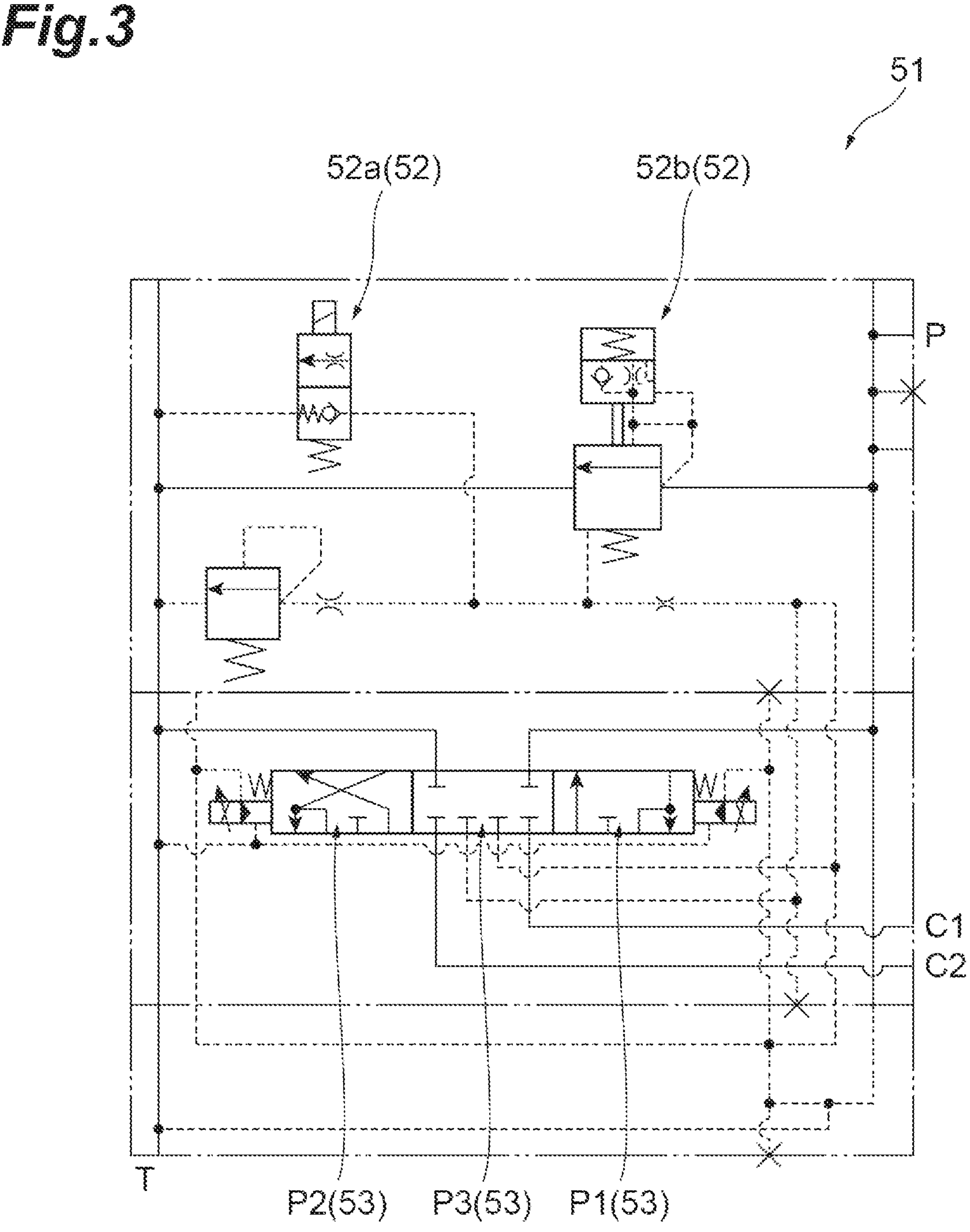
FIG. 3 is a hydraulic circuit diagram of an example of an electromagnetic proportional valve of FIG. 2.

FIG. 3 is a hydraulic circuit diagram of an example of the electromagnetic proportional valve of FIG. 2. As shown in FIG. 3, the electromagnetic proportional valve 51 includes an unloading pilot valve 52*a* and a relief valve 52*b* that constitute the unloading valve 52, and the spool 53. In the electromagnetic proportional valve 51, the hydraulic oil is supplied to the unloading pilot valve 52*a*, the relief valve 52*b*, and the spool 53 along a main circuit (a solid line in FIG. 3) extending from the symbol P. The symbol P of FIG. 3 corresponds to the symbol P of FIG. 2 and the hydraulic oil branched by the priority valve 60 is supplied thereto.

When the unloading pilot valve 52*a* is operated by the controller 10A, the hydraulic oil is supplied to the relief valve 52*b* through the unloading pilot valve 52*a* along the pilot circuit (a dashed line of FIG. 3) so that the pilot pressure is applied to the relief valve 52*b*. Accordingly, the relief valve 52*b* is operated. The symbol T of FIG. 3 corresponds to the symbol T of FIG. 2 and is connected to the return circuit 30*d* that returns the hydraulic oil from the electromagnetic proportional valve 51 to the tank 34. The hydraulic oil from the symbol P is returned to the tank 34 while flowing toward the symbol T through the relief valve 52*b* (a solid line) according to the balance of the hydraulic pressure of the hydraulic oil at the symbol P, the pressure of the tank 34, the pressure corresponding to the pressure loss up to the tank 34, and the spring set pressure of the relief valve 52*b*.

As an example, the spool 53 is configured to take three spool positions, that is, positions P1, P2, and P3. When the spool 53 is operated by the controller 10A, the spool 53 is moved so that the position of the spool 53 becomes any one of the positions P1, P2, and P3. The position P1 is a spool position in which the hydraulic oil flows from the symbol P to the symbol C1. The position P2 is a spool position in which the hydraulic oil flows from the symbol P to the symbol C2. The symbols C1 and C2 of FIG. 3 correspond to the symbols C1 and C2 of FIG. 2.

When the spool position is the position P1, the hydraulic oil flows from the symbol P to the symbol C1 through the spool 53. The hydraulic oil having passed through the symbol C1 is supplied to the supply port 32*b* of the steering cylinder 32 through the junction 30*c*, is discharged from the supply port 32*a* of the steering cylinder 32, and is returned to the symbol C2 through the junction 30*b*. The hydraulic oil having passed through the symbol C2 flows to the symbol T through the spool 53 and is returned to the tank 34.

When the spool position is the position P2, the hydraulic oil flows from the symbol P to the symbol C2 through the spool 53. The hydraulic oil having passed through the symbol C2 is supplied to the supply port 32*a* of the steering cylinder 32 through the junction 30*b*, is discharged from the supply port 32*b* of the steering cylinder 32, and is discharged to the symbol C1 through the junction 30*c*. The hydraulic oil having passed through the symbol C1 flows to the symbol T through the spool 53 and is returned to the tank 34.

When the spool position is the position P3, the hydraulic oil does not flow from the symbol P to the symbol C1 or the symbol C2. That is, when the spool position is the position P3, the spool 53 is in the neutral state.

Additionally, the PS valve 41 is connected to the tank 34 by a return circuit 30*e*. In the PS valve 41, the hydraulic oil of which the flow rate exceeds the flow rate supplied to the steering cylinder 32 in the hydraulic oil having flowed into the PS valve 41 through the priority valve 60 is returned to the tank 34 through the return circuit 30*e*. Examples of such a situation include a case in which the steering wheel 33 is not operated, a case in which the operation speed of the steering wheel 33 is relatively slow, and a case in which the operation speed of the steering wheel 33 decreases transiently.

[Configuration Related to Automatic Operation Control and Automatic Steering of Industrial Vehicle]

FIG. 4 is a block diagram showing a functional configuration of the steering apparatus for the industrial vehicle of FIG. 1. The steering apparatus 100A for the industrial vehicle includes the controller 10A which supervises the automatic operation control and the steering control of the industrial vehicle 1A. The controller 10A is an electronic control unit having a CPU [Central Processing Unit], ROM [Read Only Memory], RAM [Random Access Memory], and the like. In the controller 10A, for example, programs stored in the ROM are loaded into the RAM, and the programs loaded into the RAM are executed by the CPU, thereby realizing various functions. The controller 10A may detect the voltage of the battery B. Additionally, the controller 10A may be composed of multiple electronic units.

The controller 10A is connected to a GNSS receiver 21, a surrounding condition sensor 22, a travel information sensor 23, a map database 24, and a changeover switch (switch) 25.

The GNSS receiver 21 measures the position of the industrial vehicle 1A on the map (for example, the latitude and longitude of the industrial vehicle 1A) by receiving signals from three or more GNSS satellites. The GNSS receiver 21 transmits the measured position information of the industrial vehicle 1A to the controller 10A.

The surrounding condition sensor 22 is an in-vehicle detector that detects the surrounding situation of the industrial vehicle 1A. The surrounding condition sensor 22 includes a camera and a lidar [LiDAR: Light Detection And Ranging]. The imaging information of the camera is used, for example, for recognizing and matching the road surface pattern. Obstacle information detected by the lidar is used, for example, for danger avoidance of the industrial vehicle 1A. The surrounding condition sensor 22 transmits information on the surrounding situation of the industrial vehicle 1A to the controller 10A.

The travel information sensor 23 is a detector which detects the travel state of the industrial vehicle 1A. The travel information sensor 23 includes a vehicle speed sensor, an acceleration sensor, and a yaw rate sensor (gyro sensor). The vehicle speed sensor is a detector which detects the speed of the industrial vehicle 1A. As the vehicle speed sensor, for example, a speed sensor which is provided in each of the left traveling motor 6 and the right traveling motor 7 to detect the rotation speed of the left traveling motor 6 and the rotation speed of the right traveling motor 7 is used. The travel information sensor 23 transmits the detected travel information to the controller 10A.

The map database 24 is a database which stored the map information. The map database 24 is formed, for example, in a storage device (for example, HDD [Hard Disk Drive] and the like) mounted on the industrial vehicle 1A. The map information includes road position information, road shape information (for example, curve, type of straight section, curvature of curve, and the like), position information of intersections and branch points, position information of structures, and the like in a predetermined area including, for example, runways, takeoff and landing areas, taxiways, aprons, control towers, hangars, cargo handling areas, and charging stations at airports. The map information includes position information of the road surface pattern used for recognizing the position of the industrial vehicle 1A. Additionally, the map database 24 may be formed in a server that can communicate with the industrial vehicle 1A.

The changeover switch 25 is a switch for switching between execution and non-execution of the automatic operation control. The changeover switch 25 can take either state of the changeover switch 25, that is either of the state of executing the automatic operation control or the state of not executing the automatic operation control, depending on the operation position of the switch. The changeover switch 25 outputs a signal according to the state of the changeover switch 25 to the controller 10A.

Next, the functional configuration of the controller 10A will be described. The controller 10A includes a map information acquisition unit 11, a position information acquisition unit 12, a travel information acquisition unit 13, an automatic operation control unit 14, and a steering hydraulic control unit 15A. Additionally, a part of the function of the controller 10A described below may be implemented in a server that can communicate with the industrial vehicle 1A.

The map information acquisition unit 11 acquires the map information stored in the map database 24. The map information acquisition unit 11 acquires, for example, the position information of the road surface pattern used for recognizing the position of the industrial vehicle 1A.

The position information acquisition unit 12 acquires the position information of the industrial vehicle 1A based on the reception result of the GNSS receiver 21, the detection result of the surrounding condition sensor 22, and the map information of the map database 24. The position information acquisition unit 12 acquires the own position of the industrial vehicle 1A based on the position information of the road surface pattern included in the map information and the relative position information of the road surface pattern with respect to the industrial vehicle 1A detected by the surrounding condition sensor 22. Additionally, the position information acquisition unit 12 may estimate the own position of the industrial vehicle 1A using, for example, a SLAM [Simultaneous Localization And Mapping] technique.

The travel information acquisition unit 13 acquires the travel information of the industrial vehicle 1A based on the detection result of the travel information sensor 23. The travel information acquisition unit 13 here acquires the vehicle speed information of the industrial vehicle 1A based on the detection result of the speed sensor provided in each of the left traveling motor 6 and the right traveling motor 7. The travel information acquisition unit 13 may acquire the direction of the industrial vehicle 1A based on the detection result of the gyro sensor.

The automatic operation control unit 14 executes the automatic operation control including the automatic steering of the industrial vehicle 1A based on the position information, the travel information, the map information, and the state of the changeover switch 25. The automatic operation control unit 14 generates a travel plan along a travel route based on the measured position information of the industrial vehicle 1A of the GNSS receiver 21, the map information of the map database 24, the surrounding condition (the position of the obstacle and the like) of the industrial vehicle 1A recognized from the detection result of the surrounding condition sensor 22, and the travel state (the vehicle speed, the yaw rate, and the like) recognized from the detection result of the travel information sensor 23. The travel route is set according to the transportation command and the like of the operation management system. The travel plan includes, for example, target steering angles of the FL tire 2 and the FR tire 3. The travel plan may include a target speed.

The automatic operation control unit 14 executes the automatic operation according to the travel plan. When a signal according to the state of the execution of the automatic operation control is input from the changeover switch 25, the automatic operation control unit 14 generates the above-described travel plan by executing the automatic operation control and calculates whether the automatic steering is necessary or not according to the travel plan. When a signal indicating the non-execution of the automatic operation control is input from the changeover switch 25, the automatic operation control unit 14 does not execute the automatic operation control (the non-execution of the automatic operation control). The automatic operation control unit 14 may execute the automatic operation control to realize the target speed by transmitting a control signal to the left drive unit 6*a* and the right drive unit 7*a*.

The steering hydraulic control unit 15A controls the opening and closing of the electromagnetic proportional valve 51 according to the calculation result of the automatic operation control by the automatic operation control unit 14. The steering hydraulic control unit 15A transmits a command signal to the contactor 9 and the electromagnetic proportional valve 51 based on the calculation result of the necessity of the automatic steering by the automatic operation control unit 14 (the calculation result of the automatic operation control). The steering hydraulic control unit 15A controls the opening and closing of the electromagnetic proportional valve 51 so that the steering angles of the FL tire 2 and the FR tire 3 become the target steering angle of the automatic steering in the case of the calculation result of the automatic operation control that the automatic steering is executed during the execution of the automatic operation control. The electromagnetic proportional valve 51 is controlled to be closed, for example, in the case of the calculation result of the automatic operation control that the automatic steering is not executed during the execution of the automatic operation control and in the case of the non-execution of the automatic operation control. The steering hydraulic control unit 15A can acquire the steering angles of the FL tire 2 and the FR tire 3, for example, based on a tire steering angle sensor (not shown).

[Structure Related to Branching of Priority Valve]

Figure 5:
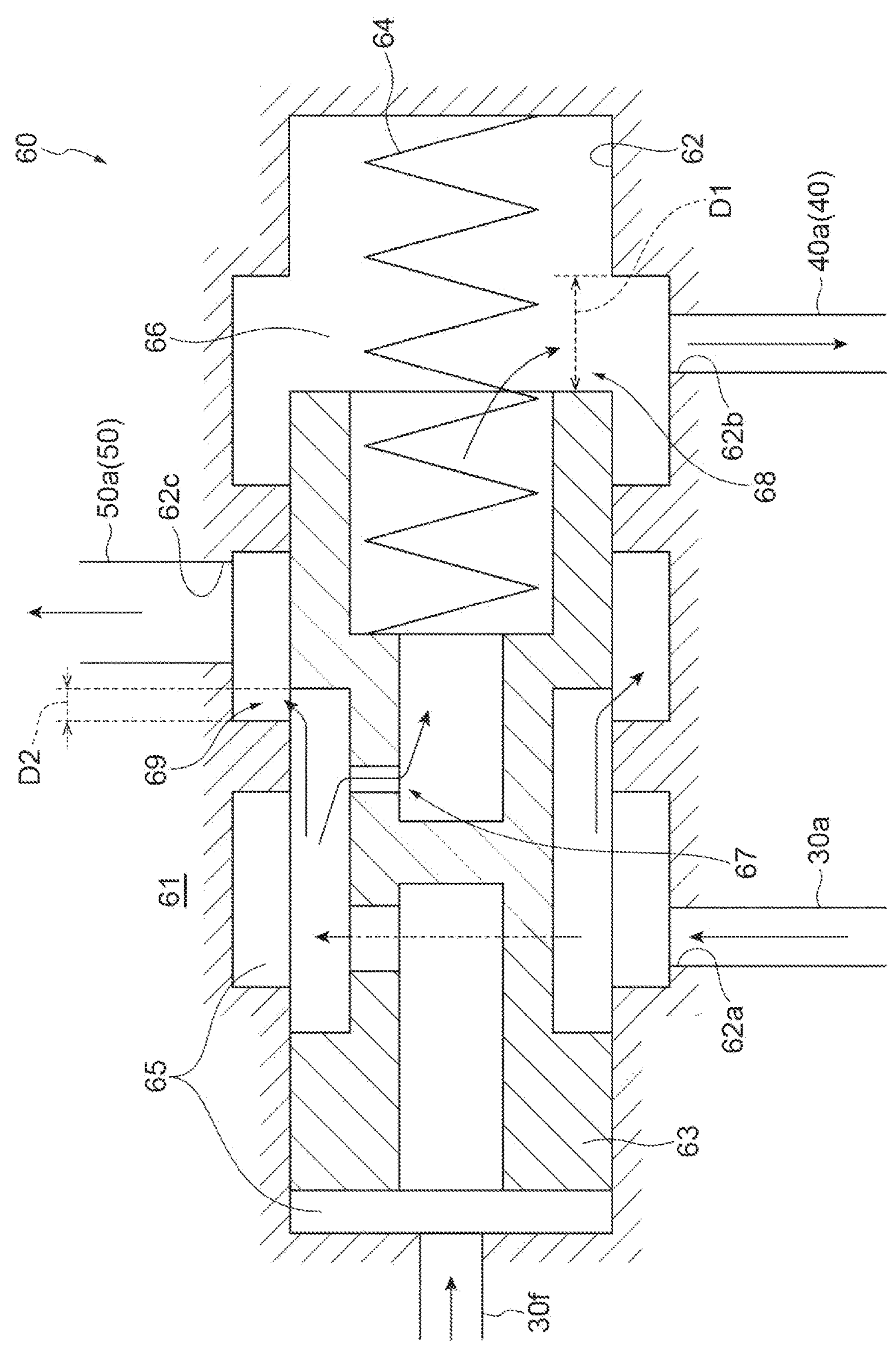
FIG. 5 is a schematic cross-sectional view taken along an axis of a priority valve of FIG. 1.
Figure 6:
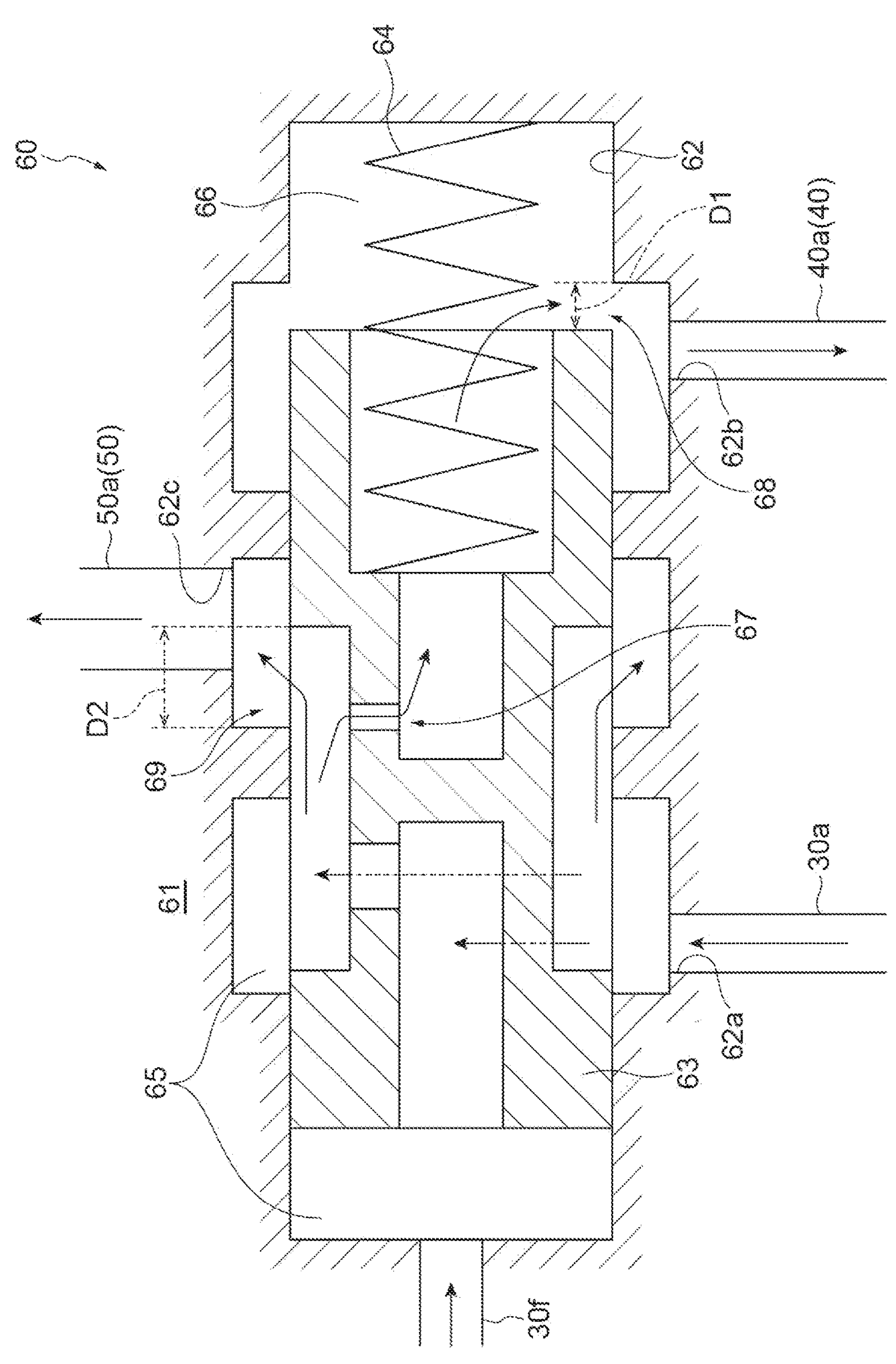
FIG. 6 is a schematic cross-sectional view taken along the axis of the priority valve of FIG. 1.

The branching of the priority valve 60 will be described in detail. FIGS. 5 and 6 are schematic cross-sectional views taken along the axis of the priority valve of FIG. 1. As shown in FIGS. 5 and 6, the priority valve 60 includes a valve support chamber 62 which is formed in the housing 61, a valve body 63 which is disposed to be slidable along the inner wall of the valve support chamber 62, and a spring 64 which is disposed between the inner wall of the valve support chamber 62 and the valve body 63 and urges the valve body 63 in one direction.

The valve support chamber 62 is formed as a substantially cylindrical cavity. The valve support chamber 62 includes a hydraulic pump side opening 62*a* which is an opening of the hydraulic pump circuit 30*a*, a manual steering side opening 62*b* which is an opening of an introduction circuit 40*a* toward the manual steering circuit 40, and an automatic steering side opening 62*c* which is an opening of the introduction circuit 50*a* toward the automatic steering circuit 50.

The valve body 63 is disposed between the hydraulic pump side opening 62*a* and the manual steering side opening 62*b* of the valve support chamber 62 to be slidable along the inner wall of the valve support chamber 62. The valve body 63 defines the valve support chamber 62 into a hydraulic pump side back pressure chamber 65 in which the hydraulic pump side opening 62*a* is located and a manual steering side back pressure chamber 66 in which the manual steering side opening 62*b* is located. The manual steering side back pressure chamber 66 is a back pressure chamber of the valve body 63 located on the side of the introduction circuit 40*a*. A circuit 30*f* branched from the hydraulic pump circuit 30*a* is connected to the hydraulic pump side back pressure chamber 65 and the hydraulic oil is supplied from the hydraulic pump 31. That is, the hydraulic pressure of the hydraulic pump side back pressure chamber 65 is the same as the hydraulic pressure of the hydraulic pump circuit 30*a*.

The priority valve 60 here is configured as a priority valve having a priority circuit on the side of the PS valve 41. The priority valve 60 preferentially supplies the hydraulic oil to the manual steering circuit 40 so that the flow rate of the hydraulic oil becomes the designed flow rate (first flow rate). The designed flow rate is a design value for the flow rate of the hydraulic oil that is preferentially supplied to the manual steering circuit 40, and is, for example, a constant flow rate value equal to or larger than a predetermined flow rate. The predetermined flow rate means the minimum required supply flow rate of the hydraulic oil to the steering cylinder 32 for the steering cylinder 32 to steer the FL tire 2 and the FR tire 3. That is, the priority valve 60 preferentially supplies the hydraulic oil to the manual steering circuit 40 at a designed flow rate equal to or larger than the predetermined flow rate so that the steering cylinder 32 can be operated regardless of whether the hydraulic oil is branched to the automatic steering circuit 50.

The priority valve 60 includes an orifice 67 which is provided according to the designed flow rate to preferentially supply the hydraulic oil toward the PS valve 41. The orifice 67 is formed in the valve body 63. The orifice 67 allows the hydraulic pump side back pressure chamber 65 and the manual steering side back pressure chamber 66 to communicate with each other. In the priority valve 60, the manual steering side opening 62*b* is formed to be located on the side opposite to the hydraulic pump side back pressure chamber 65 with respect to the orifice 67. Therefore, the hydraulic oil having flowed from the hydraulic pump circuit 30*a* into the hydraulic pump side back pressure chamber 65 is guided to the manual steering side back pressure chamber 66 through the orifice 67.

The flow rate of the hydraulic oil having passed through the orifice 67 is determined by the differential pressure of the hydraulic pressure of the hydraulic oil before and after passing through the orifice 67 and the flow path area to the manual steering side opening 62*b* in the manual steering side back pressure chamber 66. In the priority valve 60 of this embodiment, the flow path area to the manual steering side opening 62*b* in the manual steering side back pressure chamber 66 is designed to be changed so that the flow rate of the hydraulic oil passing through the orifice 67 is kept substantially constant even when the differential pressure of the hydraulic pressure of the hydraulic oil before and after passing through the orifice 67 changes. In the following description, a communication opening degree D1 is used as an index of the flow path area toward the manual steering side opening 62*b* in the manual steering side back pressure chamber 66. The communication opening degree D1 is a dimension along the axis of the valve support chamber 62 of the manual steering side communication flow path 68 guiding the hydraulic oil from the manual steering side back pressure chamber 66 to the introduction circuit 40*a*.

When the flow rate of the hydraulic oil from the hydraulic pump circuit 30*a* toward the priority valve 60 exceeds the designed flow rate, the priority valve 60 supplies the excess hydraulic oil toward the automatic steering circuit 50 on the side of the electromagnetic proportional valve 51. In the priority valve 60, the automatic steering side opening 62*c* is formed to be located on the same side as the hydraulic pump side back pressure chamber 65 with respect to the orifice 67. Therefore, the flow rate of the hydraulic oil toward the automatic steering circuit 50 is mainly determined by the flow path area toward the automatic steering side opening 62*c* in the hydraulic pump side back pressure chamber 65. In the following description, a communication opening degree D2 is used as an index of the flow path area toward the automatic steering side opening 62*c* in the hydraulic pump side back pressure chamber 65. The communication opening degree D2 is a dimension along the axis of the valve support chamber 62 of the automatic steering side communication flow path 69 guiding the hydraulic oil from the hydraulic pump side back pressure chamber 65 to the introduction circuit 50*a*.

The priority valve 60 is configured so that the communication opening degree D2 and the communication opening degree D1 change when the valve body 63 moves along the inner wall of the valve support chamber 62. Specifically, when the valve body 63 moves in a direction in which the valve body 63 is urged by the spring 64, the communication opening degree D2 of the automatic steering side communication flow path 69 decreases and the communication opening degree D1 of the manual steering side communication flow path 68 increases.

Here, in the hydraulic pump 31, the steering hydraulic control unit 15A of the controller 10A controls the rotation speed of the hydraulic pump 31 to keep the flow rate of the hydraulic oil of the hydraulic pump circuit 30*a* even when at least one of the open/closed state of the PS valve 41 by the manual steering and the open/closed state of the electromagnetic proportional valve 51 by the automatic steering changes. When at least one of the open/closed state of the PS valve 41 by the manual steering and the open/closed state of the electromagnetic proportional valve 51 of the automatic steering changes to open, pressure loss occurs when the hydraulic oil flows to at least one of the manual steering circuit 40 and the automatic steering circuit 50. In order to pump the hydraulic oil against this pressure loss, when the rotation speed of the hydraulic pump 31 increases to keep the flow rate of the hydraulic oil of the hydraulic pump circuit 30*a*, the hydraulic pressure of the hydraulic pump circuit 30*a* and the hydraulic pump side back pressure chamber 65 increases. As the hydraulic pressure increases, the valve body 63 moves toward the manual steering side back pressure chamber 66 by the urging force due to the hydraulic pressure of the hydraulic pump side back pressure chamber 65.

For example, FIG. 5 corresponds to a state in which neither the manual steering nor the automatic steering is executed and both the PS valve 41 and the electromagnetic proportional valve 51 are closed. As such a state, a case in which the steering wheel 33 is not operated in the case of the calculation result of the automatic operation control in which the automatic steering is not executed during the execution of the automatic operation control, or a case in which the steering wheel 33 is not operated during the non-execution of the automatic operation control is exemplified.

In the example of FIG. 5, since the PS valve 41 is closed, the hydraulic oil does not flow through the PS valve 41 in the manual steering circuit 40 and the pressure loss due to the flow of the hydraulic oil does not occur. Similarly, since the electromagnetic proportional valve 51 is closed, the hydraulic oil does not flow through the electromagnetic proportional valve 51 in the automatic steering circuit 50 and pressure loss associated with the flow of the hydraulic oil does not occur. In this case, since the hydraulic pressure in the hydraulic pump circuit 30*a* and the hydraulic pump side back pressure chamber 65 does not increase due to the pressure loss, the valve body 63 is not subjected to the urging force due to the hydraulic pressure of the hydraulic pump side back pressure chamber 65. Thus, the valve body 63 does not move toward the manual steering side back pressure chamber 66 and is urged only by the urging force of the spring 64 in a direction from the manual steering side back pressure chamber 66 toward the hydraulic pump side back pressure chamber 65.

In this state, since the valve body 63 moves so that the urging forces from both sides of the valve body 63 are balanced, the hydraulic pressure of the hydraulic pump side back pressure chamber 65 becomes a pressure that balances the biasing force of the spring 64. The pressure difference between the hydraulic pressure of the hydraulic pump side back pressure chamber 65 and the hydraulic pressure of the manual steering side back pressure chamber 66 becomes a predetermined pressure difference corresponding to the urging force of the spring 64. The flow rate of the hydraulic oil passing through the orifice 67 becomes a flow rate according to a predetermined pressure difference corresponding to the urging force of the spring 64. At this time, since the communication opening degree D1 is sufficiently large, the flow rate of the hydraulic oil passing through the orifice 67 corresponds to the designed flow rate supplied to the manual steering circuit 40. Further, in the example of FIG. 5, the priority valve 60 is configured so that the supply of the hydraulic oil toward the electromagnetic proportional valve 51 on the side of the automatic steering circuit 50 is not always completely interrupted.

FIG. 6 corresponds to a state in which the manual steering is also executed while the automatic steering is executed and both the PS valve 41 and the electromagnetic proportional valve 51 are opened. As such a state, a case in which the steering wheel 33 is operated in the case of the calculation result of the automatic operation control in which the automatic steering is executed during the execution of the automatic operation control is exemplified.

In the example of FIG. 6, since the electromagnetic proportional valve 51 is opened, the hydraulic oil flows through the electromagnetic proportional valve 51 in the automatic steering circuit 50 and pressure loss occurs due to the flow of the hydraulic oil. Similarly, since the PS valve 41 is opened, the hydraulic oil flows through the PS valve 41 in the manual steering circuit 40 and pressure loss occurs due to the flow of the hydraulic oil. Thus, the hydraulic pressure of the hydraulic pump circuit 30*a* and the hydraulic pump side back pressure chamber 65 increases according to the pressure loss and the urging force due to the hydraulic pressure of the hydraulic pump side back pressure chamber 65 is generated in the valve body 63. Then, the valve body 63 moves toward the manual steering side back pressure chamber 66 due to the urging force by the hydraulic pressure of the hydraulic pump side back pressure chamber 65 and the communication opening degree D1 of the manual steering side communication flow path 68 decreases.

In this state, the pressure difference between the hydraulic pressure of the hydraulic pump side back pressure chamber 65 and the hydraulic pressure of the manual steering side back pressure chamber 66 is larger than the pressure difference in the example of FIG. 5 and increases by the amount corresponding to the pressure loss in addition to the urging force of the spring 64. Since the pressure difference increases, the flow rate of the hydraulic oil passing through the orifice 67 can be larger than that of the example of FIG. 5. However, since the communication opening degree D1 is smaller than that of the example of FIG. 5, the flow rate of the hydraulic oil supplied to the manual steering circuit 40 is the same as that of the example of FIG. 5 to become a designed flow rate. A portion that exceeds the designed flow rate in the discharge amount of the hydraulic pump 31 is supplied to the automatic steering circuit 50 as an excess flow rate.

Additionally, when any one of the PS valve 41 and the electromagnetic proportional valve 51 is opened, the valve body 63 is located, for example, between FIGS. 5 and 6 to be located at a position in which the sum of the urging force due to the hydraulic pressure of the manual steering side back pressure chamber 66 and the urging force due to the spring 64 is balanced with the urging force due to the hydraulic pressure of the hydraulic pump side back pressure chamber 65. As such a state, a case in which the steering wheel 33 is not operated in the case of the calculation result of the automatic operation control in which the automatic steering is executed during the execution of the automatic operation control, or a case in which the steering wheel 33 is operated during the non-execution of the automatic operation control, is exemplified.

According to the priority valve 60 with the above-described configuration, since at least the hydraulic oil of the designed flow rate is supplied to the manual steering circuit 40 even in a state in which the electromagnetic proportional valve 51 is opened according to the calculation result of the automatic operation control, the steering cylinder 32 can be operated according to the operation of the steering wheel 33. Therefore, since the steering cylinder 32 is operated according to the operation of the steering wheel 33 by the operator, for example, if an unexpected appeared obstacle needs to be avoided when the automatic steering is executed during the execution of the automatic operation control, it is possible to avoid the obstacle by the manual steering even during the automatic steering.

Incidentally, in the above-described priority valve 60, the hydraulic oil of the excess flow rate exceeding the designed flow rate flowing to the manual steering circuit 40 is supplied to the automatic steering circuit 50. When the electromagnetic proportional valve 51 is closed in the automatic steering circuit 50, the hydraulic oil does not flow through the electromagnetic proportional valve 51 in the automatic steering circuit 50. Here, since the hydraulic oil remains in the automatic steering circuit 50 assuming that the hydraulic oil of the excess flow rate supplied to the automatic steering circuit 50 is not returned to the tank 34, the pressure (pilot pressure) of the hydraulic oil applied from the hydraulic pump 31 to the electromagnetic proportional valve 51 is high. As a result, since the drive energy (here, electric power) of the hydraulic pump 31 becomes excessively large, there is a possibility that the operation time of the steering apparatus 100A for the industrial vehicle may be shortened.

Here, in the steering apparatus 100A for the industrial vehicle, the steering hydraulic control unit 15A determines whether or not the automatic steering non-operation condition is satisfied. The unloading valve 52 is provided so that the pressure of the hydraulic oil applied to the electromagnetic proportional valve 51 can be decreased based on the determination result of the steering hydraulic control unit 15A. The steering hydraulic control unit 15A controls the unloading valve 52 to decrease the pressure of the hydraulic oil applied to the electromagnetic proportional valve 51 when it is determined that the automatic steering non-operation condition is satisfied. That is, the controller 10A and the unloading valve 52 constitute the unloading means for decreasing the pressure of the hydraulic oil supplied from the hydraulic pump 31 and applied to the electromagnetic proportional valve 51.

The automatic steering non-operation condition is a predetermined condition for determining whether or not to suspend the supply of the hydraulic oil through the electromagnetic proportional valve 51. The automatic steering non-operation condition can be a condition based on information regarding execution or non-execution of automatic operation control or vehicle speed information of the industrial vehicle 1A.

More specifically, the steering hydraulic control unit 15A may determine that the automatic steering non-operation condition is satisfied when the state of the changeover switch 25 is the automatic operation control non-execution state based on the signal from the changeover switch 25.

Alternatively, the steering hydraulic control unit 15A determines whether or not the industrial vehicle 1A has been stopped continuously for a predetermined time based on the vehicle speed information of the industrial vehicle 1A and may determine that the automatic steering non-operation condition is satisfied when it is determined that the industrial vehicle 1A has been stopped continuously for a predetermined time. When the vehicle speed of the industrial vehicle 1A is continuously equal to or lower than a predetermined stop vehicle speed threshold value for a predetermined time, the steering hydraulic control unit 15A may determine that the industrial vehicle 1A has been stopped continuously for a predetermined time. The predetermined stop vehicle speed threshold value and the predetermined time are not particularly limited, but can be, for example, several km/h for several minutes assuming that the industrial vehicle 1A is left in a stopped state.

The automatic steering non-operation condition is not limited to the above-described specific examples. For example, the steering hydraulic control unit 15A may determine that the automatic steering non-operation condition is satisfied when there is a failure in the configuration (for example, any one of the GNSS receiver 21, the surrounding condition sensor 22, the travel information sensor 23, the map database 24, and the changeover switch 25) for executing the automatic operation.

According to the above-described unloading means, when the automatic steering non-operation condition is satisfied, the pressure of the hydraulic oil supplied from the hydraulic pump 31 and applied to the electromagnetic proportional valve 51 can be decreased compared to the case in which the automatic steering non-operation condition is not satisfied.

[Example of Calculation Process by Controller]

Figure 7:
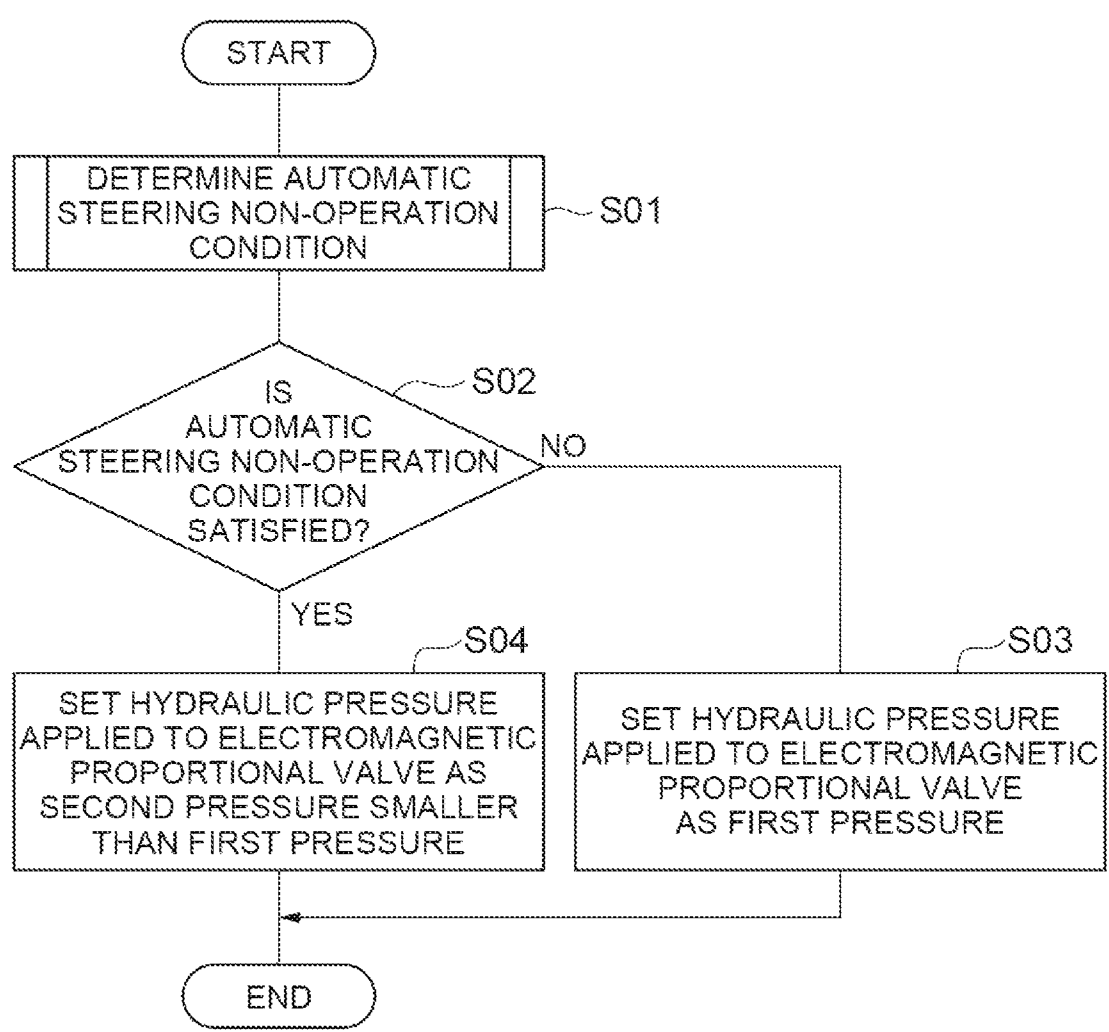
FIG. 7 is a flowchart exemplifying an unloading process of a controller of FIG. 1.

Next, an example of the calculation process by the controller 10A will be described. FIG. 7 is a flowchart exemplifying an unloading process of the controller of FIG. 1. The process shown in FIG. 7 is executed, for example, when a main power supply of the industrial vehicle 1A is turned on and the power supply to the hydraulic pump 31 is available.

As shown in FIG. 7, the controller 10A determines whether or not the automatic steering non-operation condition is satisfied by the steering hydraulic control unit 15A in S01. As the process of S01, the controller 10A specifically executes the automatic steering non-operation condition determination process exemplified in FIG. 8.

Figure 8:
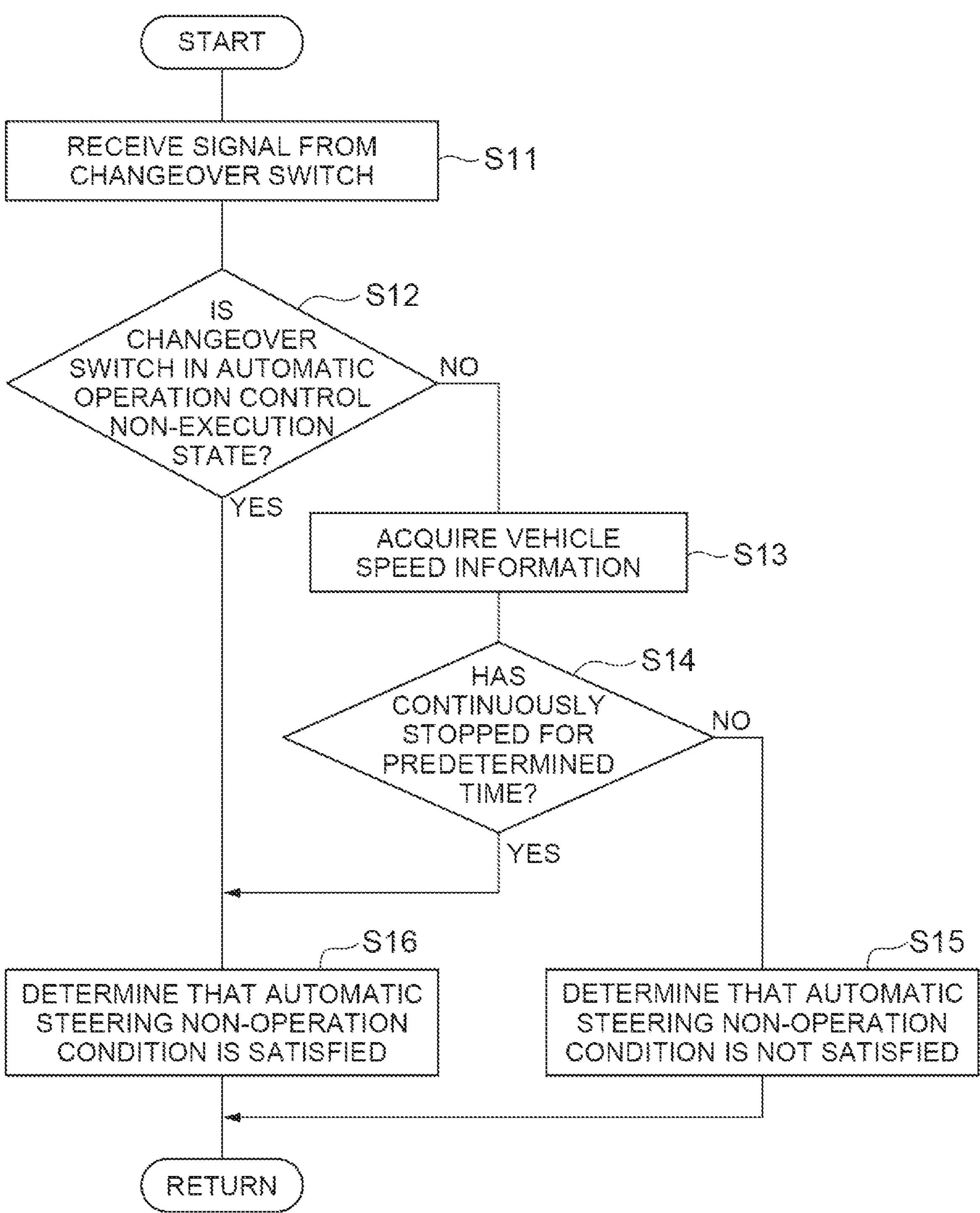
FIG. 8 is a flowchart exemplifying an automatic steering non-operation condition determination process of FIG. 7.

FIG. 8 is a flowchart exemplifying the automatic steering non-operation condition determination process of FIG. 7. As shown in FIG. 8, the controller 10A receives a signal from the changeover switch 25 by the steering hydraulic control unit 15A in S11. The steering hydraulic control unit 15A receives a signal according to the state of the changeover switch 25 from the changeover switch 25.

In S12, the controller 10A determines whether or not the current state is the automatic operation control non-execution state by the steering hydraulic control unit 15A. The controller 10A determines that the current state is the automatic operation control non-execution state, for example, when the state of the changeover switch 25 is the automatic operation control non-execution state based on a signal from the changeover switch 25.

The controller 10A shifts the process to S16 to be described below when the state of the changeover switch 25 is the automatic operation control non-execution state (S12=YES). The controller 10A shifts the process to S13 when the state of the changeover switch 25 is the automatic operation control execution state (S12=NO).

In S13, the controller 10A acquires the vehicle speed information by the travel information acquisition unit 13. The travel information acquisition unit 13 acquires the vehicle speed information of the industrial vehicle 1A based on the detection result of the travel information sensor 23 (for example, the rotation speed of the left traveling motor 6 and the rotation speed of the right traveling motor 7).

In S14, the controller 10A determines whether or not the industrial vehicle 1A has been stopped continuously for a predetermined time by the steering hydraulic control unit 15A. The steering hydraulic control unit 15A determines that the industrial vehicle 1A has been stopped continuously for a predetermined time, for example, when the vehicle speed of the industrial vehicle 1A is continuously equal to or lower than a predetermined stop vehicle speed threshold value for a predetermined time based on the vehicle speed information. The steering hydraulic control unit 15A shifts the process to S16 to be described below when it is determined that the industrial vehicle 1A has been stopped continuously for a predetermined time (S14=YES). The steering hydraulic control unit 15A shifts the process to S15 when it is determined that the industrial vehicle 1A has not stopped continuously for a predetermined time (S14=NO).

In S15, the controller 10A determines that the automatic steering non-operation condition is not satisfied by the steering hydraulic control unit 15A. On the other hand, the controller 10A determines that the automatic steering non-operation condition is satisfied by the steering hydraulic control unit 15A in S16. Then, the controller 10A ends the process of FIG. 8 and shifts the process to S02 of FIG. 7.

Returning to FIG. 7, the controller 10A shifts the process to S04 to be described below when the steering hydraulic control unit 15A determines that the automatic steering non-operation condition is satisfied (S02=YES) in S02. The controller 10A shifts the process to S03 when the steering hydraulic control unit 15A determines that the automatic steering non-operation condition is not satisfied (S02=NO) in S02.

In S03, the controller 10A sets the hydraulic pressure (pilot pressure) applied to the electromagnetic proportional valve 51 as a first pressure by the steering hydraulic control unit 15A. The first pressure is the pressure of the hydraulic oil when the hydraulic oil of the excess flow rate supplied to the automatic steering circuit 50 is not returned to the tank 34. In this embodiment, in S03, the steering hydraulic control unit 15A controls the unloading valve 52 (for example, the unloading valve 52 is closed) so that the unloading valve 52 does not cause the pressure of the hydraulic oil applied to the electromagnetic proportional valve 51 not to decrease. Accordingly, the hydraulic pressure (pilot pressure) applied to the electromagnetic proportional valve 51 is the first pressure. Then, the controller 10A ends the process of FIG. 7. The controller 10A may repeat the process of FIG. 7 after a predetermined calculation period.

In S04, the controller 10A sets the hydraulic pressure (pilot pressure) applied to the electromagnetic proportional valve 51 as a second pressure smaller than the first pressure by the steering hydraulic control unit 15A. The second pressure is the pressure of the hydraulic oil when the hydraulic oil of the excess flow rate supplied to the automatic steering circuit 50 is returned to the tank 34. In this embodiment, in S04, the steering hydraulic control unit 15A controls the unloading valve 52 (for example, the unloading valve 52 is opened) so that the unloading valve 52 causes the pressure of the hydraulic oil applied to the electromagnetic proportional valve 51 to decrease compared to the determination case in which the automatic steering non-operation condition is not satisfied (S02=NO). Accordingly, the hydraulic pressure (pilot pressure) applied to the electromagnetic proportional valve 51 is the second pressure. Then, the controller 10A ends the process of FIG. 7. The controller 10A may repeat the process of FIG. 7 after a predetermined calculation period.

Operation and Effect of First Embodiment

In the steering apparatus 100A for the industrial vehicle, the hydraulic oil is branched between the manual steering circuit 40 and the automatic steering circuit 50 by the priority valve 60 and is preferentially supplied to the manual steering circuit 40 at a designed flow rate equal to or larger than the predetermined flow rate for operating the steering cylinder 32. Accordingly, since at least the hydraulic oil of a predetermined flow rate is supplied to the manual steering circuit 40 even when the electromagnetic proportional valve 51 is opened according to the calculation result of the automatic operation control, the steering cylinder 32 can be operated according to the operation of the steering wheel 33. Thus, according to the steering apparatus 100A for the industrial vehicle, the steering hydraulic circuit 30 can be allowed to function so that the manual steering is available even when the automatic steering is available.

Additionally, as a comparative example, in a configuration in which a lock valve that is operated according to an electric signal is used instead of the priority valve 60 for the branching between the manual steering circuit 40 and the automatic steering circuit 50 and a spare battery is used to transmit an electric signal to the lock valve, it is impossible to operate the lock valve and to execute the manual steering if the spare battery fails. On the other hand, according to the steering apparatus 100A for the industrial vehicle using the priority valve 60 as described in the present disclosure, since it is possible to mechanically supply the hydraulic oil of the designed flow rate to the manual steering circuit 40 without a power source such as the above-described spare battery, the steering wheel 33 and the PS valve 41 are substantially mechanically coupled. Accordingly, it is possible to avoid the inability to execute the manual steering due to the failure of the shunt power supply. Further, since it is possible to omit the configuration of the power supply such as the spare battery, it is possible to suppress an increase in the number of parts.

The steering apparatus 100A for the industrial vehicle further includes unloading means for decreasing the pressure of the hydraulic oil supplied from the hydraulic pump 31 and applied to the electromagnetic proportional valve 51 compared to the case in which a predetermined automatic steering non-operation condition for suspending the supply of the hydraulic oil through the electromagnetic proportional valve 51 is not satisfied, when the automatic steering non-operation condition is satisfied. Accordingly, an unnecessary load is applied to the hydraulic pump 31, since the pressure of the hydraulic oil from the hydraulic pump 31 is always applied to the electromagnetic proportional valve 51 assuming that the hydraulic oil of the excess flow rate supplied to the automatic steering circuit 50 is not returned to the tank 34, when the priority valve 60 is configured so that the supply of the hydraulic oil to the electromagnetic proportional valve 51 is not completely interrupted. Here, by using the unloading means, it is possible to suppress an unnecessary load from being applied to the hydraulic pump 31, by decreasing the pressure of the hydraulic oil supplied from the hydraulic pump 31 and applied to the electromagnetic proportional valve 51, when the automatic steering non-operation condition is satisfied. As a result, it is possible to suppress the operation time of the steering apparatus 100A for the industrial vehicle from being shortened due to an unnecessary load applied to the hydraulic pump 31. Further, since the load of the hydraulic pump 31 is decreased, the oil temperature of the hydraulic oil is less likely to increase and, for example, overheating of the hydraulic pump 31 and the hydraulic oil is less likely to occur in a high-temperature environment. Further, it is possible to employ the hydraulic pump 31 with relatively low heat resistance.

In the steering apparatus 100A for the industrial vehicle, the unloading means includes the controller 10A which determines whether or not the automatic steering non-operation condition is satisfied based on the execution or non-execution information of the automatic operation control or the vehicle speed information of the industrial vehicle 1A and the unloading valve 52 which is provided to capable of decreasing the pressure of the hydraulic oil supplied from the hydraulic pump 31 and applied to the electromagnetic proportional valve 51 based on the determination result of the controller 10A. The controller 10A controls the unloading valve 52 to decrease the pressure of the hydraulic oil supplied from the hydraulic pump 31 and applied to the electromagnetic proportional valve 51 when it is determined that the automatic steering non-operation condition is satisfied. Accordingly, it is possible to decrease the pressure of the hydraulic oil supplied from the hydraulic pump 31 and applied to the electromagnetic proportional valve 51 when the automatic steering non-operation condition is satisfied by controlling the unloading valve 52 based on the determination result of the controller 10A.

In the steering apparatus 100A for the industrial vehicle, the controller 10A determines that the automatic steering non-operation condition is satisfied when the state of the changeover switch 25 is the automatic operation control non-execution state, based on a signal from the changeover switch 25 for switching the execution or non-execution of the automatic operation control. Accordingly, it is possible to suppress an unnecessary load from being applied to the hydraulic pump 31 when the automatic operation control is not executed and the automatic steering is not executed.

In the steering apparatus 100A for the industrial vehicle, the controller 10A determines whether or not the industrial vehicle 1A has been stopped continuously for a predetermined time based on the vehicle speed information of the industrial vehicle 1A, and determines that the automatic steering non-operation condition is satisfied when it is determined that the industrial vehicle 1A has been stopped continuously for a predetermined time. Accordingly, it is possible to suppress an unnecessary load from being applied to the hydraulic pump 31 while the industrial vehicle 1A has been stopped continuously for a predetermined time.

Modified Example of First Embodiment

As described above, the first embodiment according to the present disclosure has been described, but the present disclosure is not limited to the above-described first embodiment.

The unloading means is not limited to the unloading valve 52 and the controller 10A controlling the unloading valve 52. For example, as a modified example of the unloading means, the controller 10A may control the rotation speed of the (constant displacement) hydraulic pump 31 based on the determination result of the controller 10A. The controller 10A can decrease the pressure of the hydraulic oil supplied from the hydraulic pump 31 and applied to the electromagnetic proportional valve 51, by decreasing the rotation speed of the hydraulic pump 31 when the automatic steering non-operation condition is satisfied.

Alternatively, as another modified example of the unloading means, the hydraulic pump 31 may be a variable displacement pump configured to be able to change the hydraulic oil discharge amount during operation. The controller 10A may control the variable displacement pump to decrease the hydraulic oil discharge amount when it is determined that the automatic steering non-operation condition is satisfied. In this case, it is possible to decrease the pressure of the hydraulic oil supplied from the variable displacement pump and applied to the electromagnetic proportional valve 51, when the automatic steering non-operation condition is satisfied by controlling the discharge amount during the operation of the variable displacement pump based on the determination result of the controller 10A.

In the above-described first embodiment, the steering apparatus 100A for the industrial vehicle includes the unloading means, but the unloading means may be omitted. In this case, as in the example of FIG. 5, the priority valve 60 is configured so that the supply of the hydraulic oil to the electromagnetic proportional valve 51 on the side of the automatic steering circuit 50 is not always completely interrupted, but a branching valve configured to completely interrupt the supply of the hydraulic oil may be used. Since the supply of the hydraulic oil to the electromagnetic proportional valve 51 is completely interrupted, it is possible to expect a decrease in the pressure of the hydraulic oil supplied from the hydraulic pump 31 and applied to the electromagnetic proportional valve 51 (pilot pressure) compared to the case in which the supply of the hydraulic oil is not completely interrupted.

Second Embodiment

Figure 9:
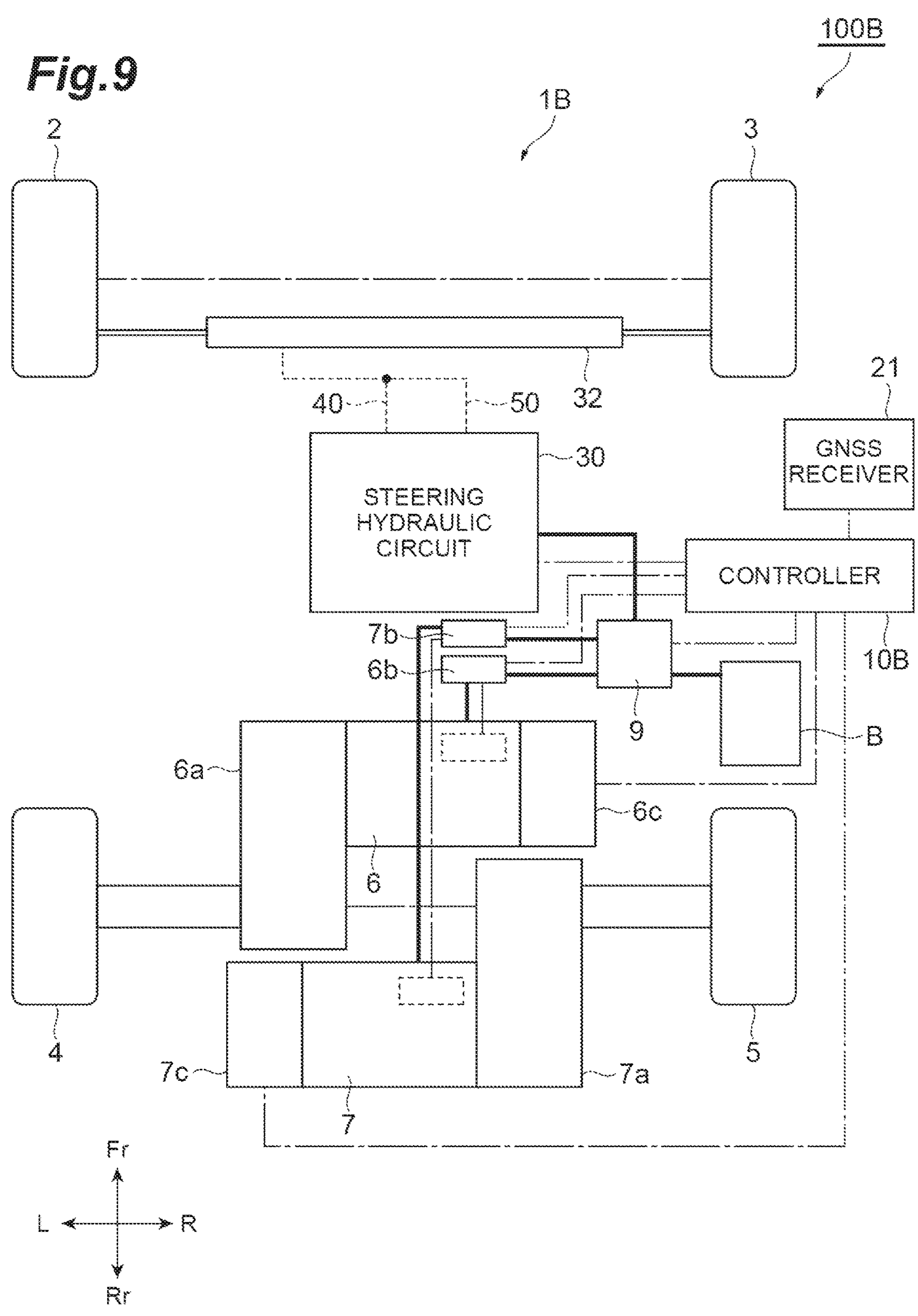
FIG. 9 is a schematic configuration diagram of an industrial vehicle to which a steering apparatus for an industrial vehicle according to a second embodiment is applied.
Figure 10:
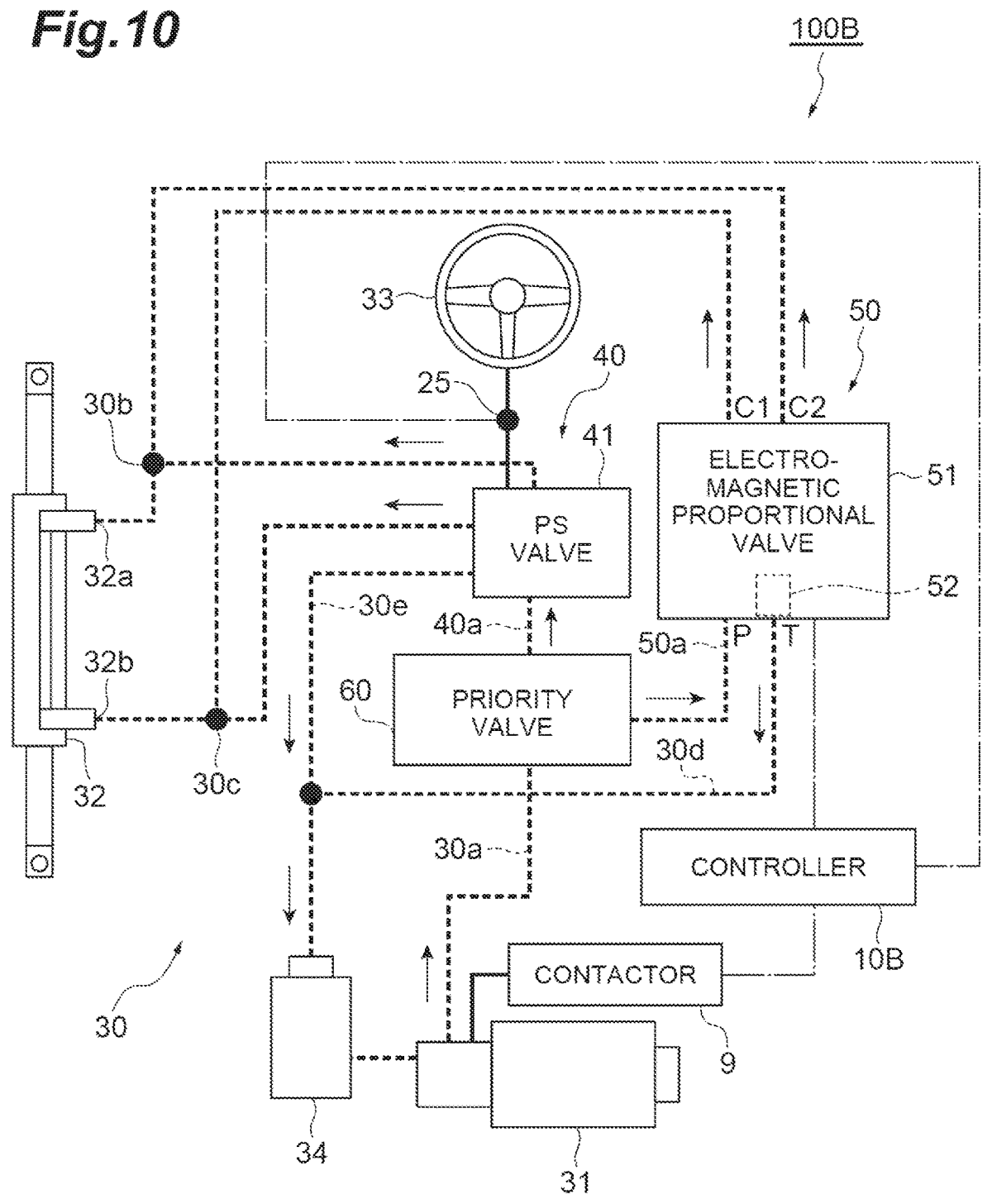

FIG. 9 is a schematic configuration diagram of an industrial vehicle to which a steering apparatus for an industrial vehicle according to a second embodiment is applied. FIG. 10 is a schematic circuit diagram showing a configuration of a steering hydraulic circuit of FIG. 9. FIG. 11 is a block diagram showing a functional configuration of the steering apparatus for the industrial vehicle of FIG. 9.

An industrial vehicle 1B shown in FIG. 9 is different from the industrial vehicle 1A shown in FIG. 1 in that a steering apparatus 100B for an industrial vehicle is provided instead of the steering apparatus 100A for the industrial vehicle. The industrial vehicle 1B is configured similarly to the industrial vehicle 1A in other points.

The steering apparatus 100B for the industrial vehicle is different from the steering apparatus 100A for the industrial vehicle shown in FIG. 1 in that a controller (control unit) 10B is provided instead of the controller 10A and a steering angle sensor (steering operation detection unit) 26 is provided instead of the changeover switch 25. The steering apparatus 100B for the industrial vehicle is configured similarly to the steering apparatus 100A for the industrial vehicle in other points. The controller 10B is connected to the steering angle sensor 26.

The steering angle sensor 26 is a detector that detects the steering angle of the steering wheel 33. The steering angle sensor 26 is provided on, for example, the shaft of the steering wheel 33. The steering angle sensor 26 transmits the detected steering angle information to the controller 10B. The steering angle sensor 26 constitutes the steering operation detection unit that detects the operation of the steering wheel 33.

In the second embodiment, the operation of the unloading valve 52 is controlled by the controller 10B. For example, a steering hydraulic control unit 15B detects the operation of the steering wheel 33 based on the detection result of the steering angle sensor 26 in addition to the function of the steering hydraulic control unit 15A. That is, the steering hydraulic control unit 15B functions as the steering operation detection unit together with the steering angle sensor 26. The function of the steering operation detection unit will be described in detail later.

As described above, the priority valve 60 is configured as a priority valve having a priority circuit on the side of the PS valve 41. The priority valve 60 preferentially supplies the hydraulic oil to the manual steering circuit 40 so that the flow rate of the hydraulic oil becomes a designed flow rate (first flow rate). The priority valve 60 supplies excess hydraulic oil to the automatic steering circuit 50 on the side of the electromagnetic proportional valve 51 when the flow rate of the hydraulic oil from the hydraulic pump circuit 30*a* to the priority valve 60 exceeds the designed flow rate. That is, the priority valve 60 preferentially supplies the hydraulic oil to the manual steering circuit 40 at a first flow rate equal to or larger than the predetermined flow rate for operating the steering cylinder 32 in the hydraulic oil discharged from the hydraulic pump 31, and supplies the hydraulic oil to the automatic steering circuit 50 at a second flow rate which is an excess flow rate excluding the first flow rate in the hydraulic oil discharged from the hydraulic pump 31.

Incidentally, in the above-described priority valve 60, the hydraulic oil of the second flow rate which is the excess flow rate excluding the designed flow rate (first flow rate) flowing to the manual steering circuit 40 in the hydraulic oil discharged from the hydraulic pump 31, is supplied to the automatic steering circuit 50. Here, for example, assuming that the hydraulic fluid of the second flow rate is supplied to the steering cylinder 32 through the automatic steering circuit 50 regardless of whether the steering wheel 33 is operated or not, both the hydraulic oil flowing through the manual steering circuit 40 and the hydraulic oil flowing through the automatic steering circuit 50 can be supplied to the steering cylinder 32 at the same time. Therefore, when the steering wheel 33 is operated, there is a possibility that the hydraulic oil supplied to the automatic steering circuit 50 may affect the operation of the steering cylinder 32 according to the operation of the steering wheel 33. Particularly, when the operation speed of the steering wheel 33 is relatively slow, an excess flow rate to the automatic steering circuit is likely to occur. Therefore, there is a possibility that the operation of the steering cylinder 32 will be greatly affected by the operation of the steering wheel 33 compared to the case in which the operation speed of the steering wheel 33 is relatively fast.

Specifically, as an effect on the operation of the steering cylinder 32, for example, when the hydraulic oil flowing through the automatic steering circuit 50 and the hydraulic oil flowing through the manual steering circuit 40 are supplied to the steering cylinder 32 to be the same steering direction, there is a possibility that the steered wheel may be steered more than the operation of the steering wheel 33. In contrast, when the hydraulic oil flowing through the automatic steering circuit 50 and the hydraulic oil flowing through the manual steering circuit 40 are supplied to the steering cylinder 32 to be the opposite steering directions, there is a possibility that the steering of the steered wheel may be disturbed by the operation of the steering wheel 33 so that the response to the operation becomes worse (becoming less efficient).

Here, the steering apparatus 100B for the industrial vehicle includes supply restricting means for restricting the supply of the hydraulic oil to the steering cylinder 32 through the automatic steering circuit 50 when the steering hydraulic control unit 15B detects the operation of the steering wheel 33. The "case in which the steering hydraulic control unit 15B detects the operation of the steering wheel 33" corresponds to a case in which the hydraulic oil supplied to the automatic steering circuit 50 is likely to affect the operation of the steering cylinder 32 according to the operation of the steering wheel 33.

The steering hydraulic control unit 15B detects the operation of the steering wheel 33 based on the detection result of the steering angle sensor 26. In the present disclosure, the operation of the steering wheel 33 is a predetermined operation of the steering wheel 33 by the operator of the industrial vehicle 1B. The predetermined operation means the operation of the steering wheel 33 in which the operation of the steering cylinder 32 due to the hydraulic oil flowing through the manual steering circuit 40 is likely to be affected by the hydraulic oil flowing through the automatic steering circuit 50. Additionally, the detection of the operation of the steering wheel 33 by the following steering hydraulic control unit 15B may be executed on the condition that the automatic operation control is executed.

As an example of the predetermined operation, the operator operates the steering wheel 33 such that the steering speed is slower than a certain level. The steering hydraulic control unit 15B detects the predetermined operation, for example, when the steering speed of the steering wheel 33 is equal to or lower than a predetermined steering speed threshold value based on the steering angle change amount over time (rotation speed) detected by the steering angle sensor 26. The steering speed threshold value is a rotation speed threshold value for determining whether or not the operation of the steering wheel 33 by the operator is the predetermined operation. The steering speed threshold value can be set in advance, for example, in consideration of the excess flow rate to the automatic steering circuit 50. Since a small amount of the designed flow rate flowing from the priority valve 60 to the PS valve 41 is supplied to the steering cylinder 32 through the manual steering circuit 40 as the steering speed of the steering wheel 33 decreases, the excess flow rate increases. Here, the steering speed threshold value may be the steering speed of the steering wheel 33 at which the excess flow rate is equal to or larger than a certain amount (for example, half of the designed flow rate).

As an example of the predetermined operation, the operator operates the steering wheel 33 such that the steering direction of the steered wheel of the manual steering does not match the direction of the automatic steering. If the hydraulic oil is supplied to the steering cylinder 32 through the automatic steering circuit 50 when the steering direction of the steered wheel of the manual steering does not match the direction of the automatic steering, the steering of the steered wheel by the operation of the steering wheel 33 is more likely to be hindered compared to the case in which the steering direction of the steered wheel matches the direction of the automatic steering. Here, the steering hydraulic control unit 15B may detect the predetermined operation, for example, when the steering direction of the steered wheel of the manual steering does not match the direction of the automatic steering based on the steering angle change amount over time (rotation direction) detected by the steering angle sensor 26.

As the restriction by the supply restricting means, for example, when the steering hydraulic control unit 15B detects the operation of the steering wheel 33, the controller 10B controls the electromagnetic proportional valve 51 so that the hydraulic oil is not supplied from the hydraulic pump 31 to the steering cylinder 32 through the electromagnetic proportional valve 51 (for example, the spool 53 is neutralized). Accordingly, it is possible to suppress the hydraulic oil from being supplied to the steering cylinder 32 through the automatic steering circuit 50. That is, the controller 10B and the electromagnetic proportional valve 51 constitute the supply restricting means for restricting the supply of the hydraulic oil to the steering cylinder 32 through the automatic steering circuit 50 when the steering hydraulic control unit 15B detects the operation of the steering wheel 33.

As another restriction by the supply restricting means, the unloading valve 52 of the electromagnetic proportional valve 51 is provided to be capable of decreasing the pressure of the hydraulic oil of the automatic steering circuit 50. Here, the controller 10B may control the unloading valve 52 so that the hydraulic oil is returned to the tank 34 through the return circuit 30*d* when the predetermined operation of the steering wheel 33 is detected. Accordingly, the pressure of the hydraulic oil of the automatic steering circuit 50 is decreased and the supply of the hydraulic oil to the steering cylinder 32 through the automatic steering circuit 50 can be suppressed. In this case, the controller 10B and the unloading valve 52 constitute the supply restricting means for restricting the supply of the hydraulic oil to the steering cylinder 32 through the automatic steering circuit 50 when the steering hydraulic control unit 15B detects the operation of the steering wheel 33.

Figure 12:
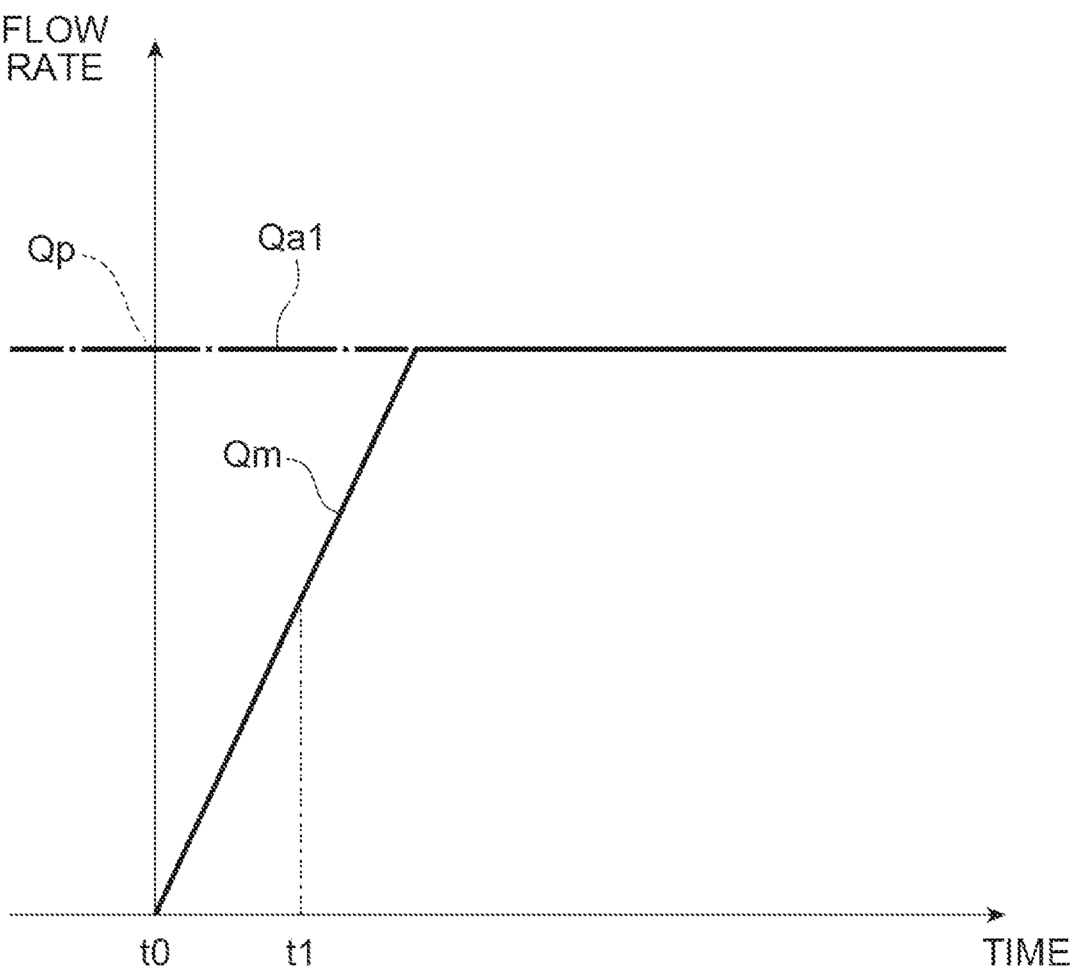
FIG. 12 is a timing chart showing a flow rate of hydraulic oil toward a steering cylinder when there is no restriction by supply restricting means.

A restricting operation by the supply restricting means will be described with reference to FIGS. 12 and 13. FIG. 12 is a timing chart showing the flow rate of the hydraulic oil to the steering cylinder when there is no restriction by the supply restricting means. FIG. 12 corresponds to a situation in which the manual steering is also executed when the automatic steering is executed. In FIG. 12, the horizontal axis indicates time and the vertical axis indicates the flow rate of the hydraulic oil.

In the example of FIG. 12, a flow rate Qa1 indicates the flow rate of the hydraulic oil supplied to the steering cylinder 32 through the automatic steering circuit 50 when there is no restriction by the supply restricting means. A flow rate Qm indicates the flow rate of the hydraulic oil supplied to the steering cylinder 32 through the manual steering circuit 40 according to the operation of the steering wheel 33. In order to simplify the description, the flow rate Qa1 and the flow rate Qm are smaller than the discharge amount of the hydraulic pump 31 and can be respectively increased to a predetermined flow rate Qp for operating the steering cylinder 32.

FIG. 12 shows a state in which the automatic steering is executed from before the time t0 according to the calculation result of the automatic operation control and the electromagnetic proportional valve 51 is opened. Thus, the hydraulic oil of the flow rate Qa1 which is the same as the predetermined flow rate Qp is supplied to the steering cylinder 32 through the automatic steering circuit 50. On the other hand, since the operator has not started the operation of the steering wheel 33 before the time to, the PS valve 41 is closed. Since the hydraulic oil of the designed flow rate supplied to the manual steering circuit 40 is returned to the tank 34 through the return circuit 30*e*, the flow rate Qm before the time t0 is 0.

At the time t0, the operator starts the operation of the steering wheel 33 so that the PS valve 41 is further opened while the electromagnetic proportional valve 51 is opened. After the time t0, the hydraulic oil is supplied to the manual steering circuit 40 so that the flow rate Qm increases as the PS valve 41 is opened.

In the example of FIG. 12, even when the operator starts the operation of the steering wheel 33 at the time t0, the hydraulic oil is continuously supplied to the steering cylinder 32 through the automatic steering circuit 50 at the flow rate Qa1 even after the time to. Therefore, there is concern that the hydraulic oil supplied to the steering cylinder 32 through the automatic steering circuit 50 may affect the operation of the steering cylinder 32 according to the operation of the steering wheel 33. As an example, the steering cylinder 32 tends to be operated according to the automatic steering rather than the manual steering during the period from the time t0 to t1 when the flow rate Qm becomes approximately half or less of the flow rate Qa1. In this case, the steering of the steered wheel by the operation of the steering wheel 33 is hindered and the response to the operation deteriorates (the efficiency decreases).

Figure 13:
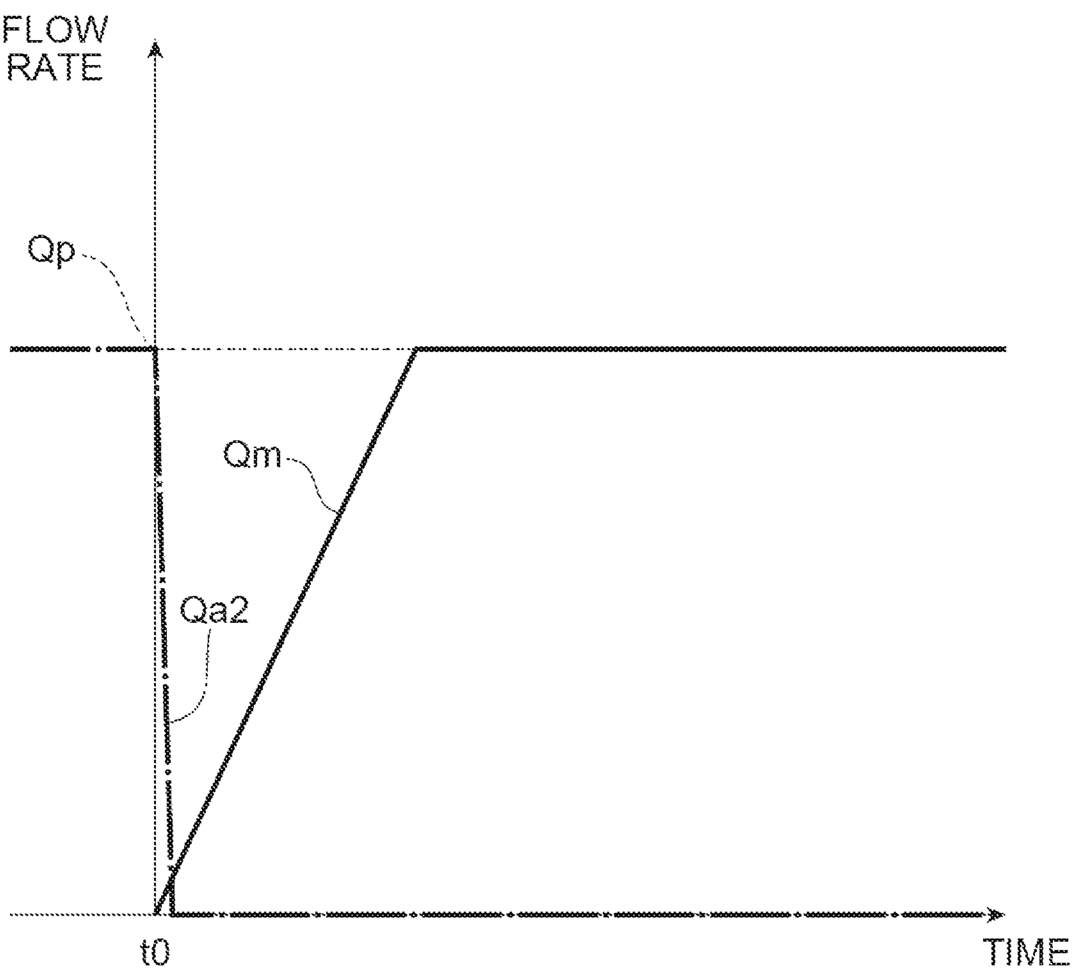
FIG. 13 is a timing chart showing a flow rate of hydraulic oil toward the steering cylinder when there is restriction by the supply restricting means.

FIG. 13 is a timing chart showing the flow rate of the hydraulic oil to the steering cylinder when there is a restriction by the supply restricting means. In the example of FIG. 13, a flow rate Qa2 indicates the flow rate of the hydraulic oil supplied to the steering cylinder 32 through the automatic steering circuit 50 when there is a restriction by the supply restricting means. FIG. 13 is the same as FIG. 12 except for the flow rate Qa2.

In FIG. 13, the automatic steering is executed from before the time t0 according to the calculation result of the automatic operation control and the electromagnetic proportional valve 51 is opened. However, the operator starts the operation of the steering wheel 33 to execute the restriction by the supply restricting means at the time t0. Accordingly, since the hydraulic oil is not supplied to the steering cylinder 32 through the automatic steering circuit 50, the flow rate Qa2 becomes 0. Thus, it is possible to suppress the hydraulic oil supplied through the automatic steering circuit 50 from hindering the operation of the steering cylinder 32 according to the operation of the steering wheel 33.

[Example of Calculation Process by Controller]

Figure 14:
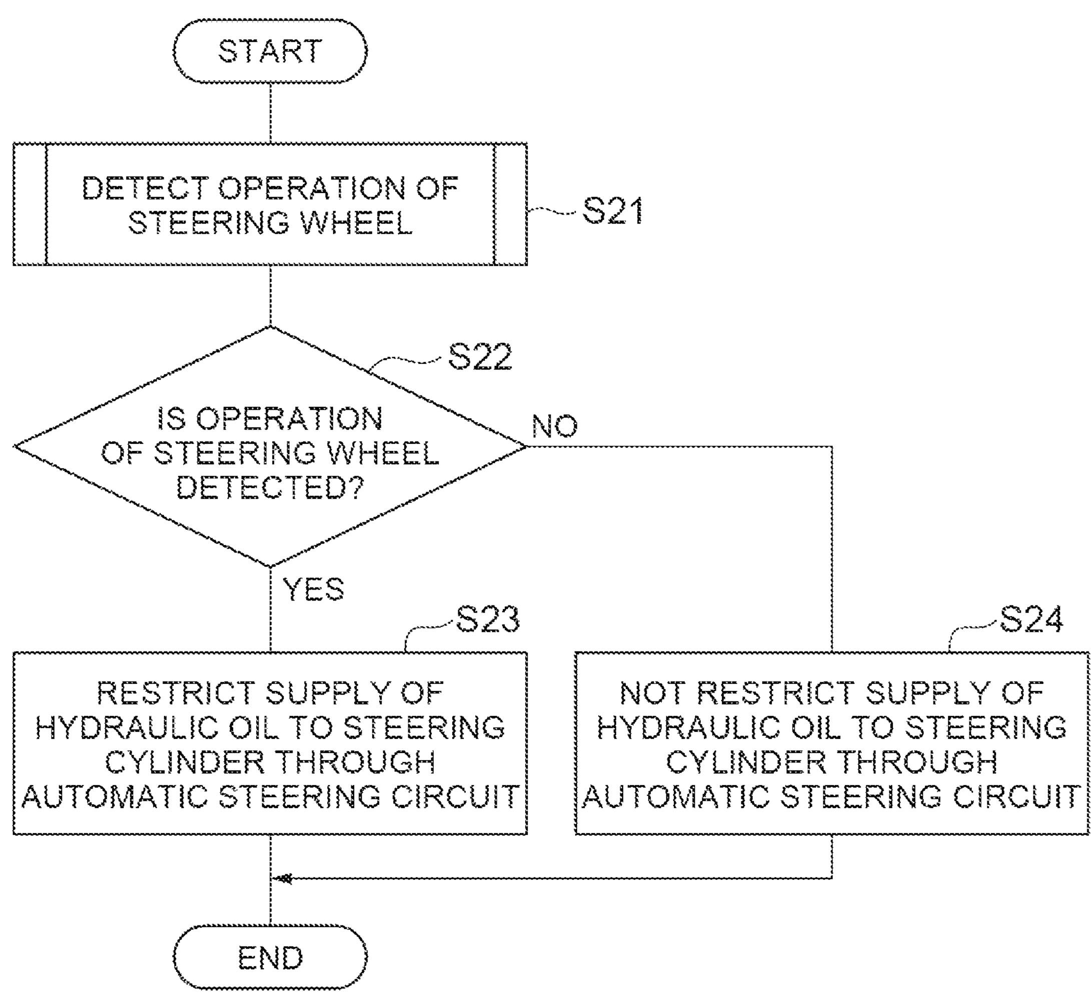
FIG. 14 is a flowchart exemplifying a supply restriction process of a controller of FIG. 9.

Next, an example of the calculation process by the controller 10B will be described. FIG. 14 is a flowchart exemplifying a supply restriction process by the controller of FIG. 9. The process shown in FIG. 14 is executed, for example, during the execution of the automatic operation control of the industrial vehicle 1B. For example, the process is executed in a situation in which the automatic steering is executed by the automatic operation control and the spool 53 of the electromagnetic proportional valve 51 is located at a position other than the neutral position.

As shown in FIG. 14, the controller 10B detects the operation of the steering wheel 33 by the steering hydraulic control unit 15B in S21. Specifically, the controller 10B executes a steering operation detection process exemplified in FIG. 15 as the process of S21.

Figure 15:
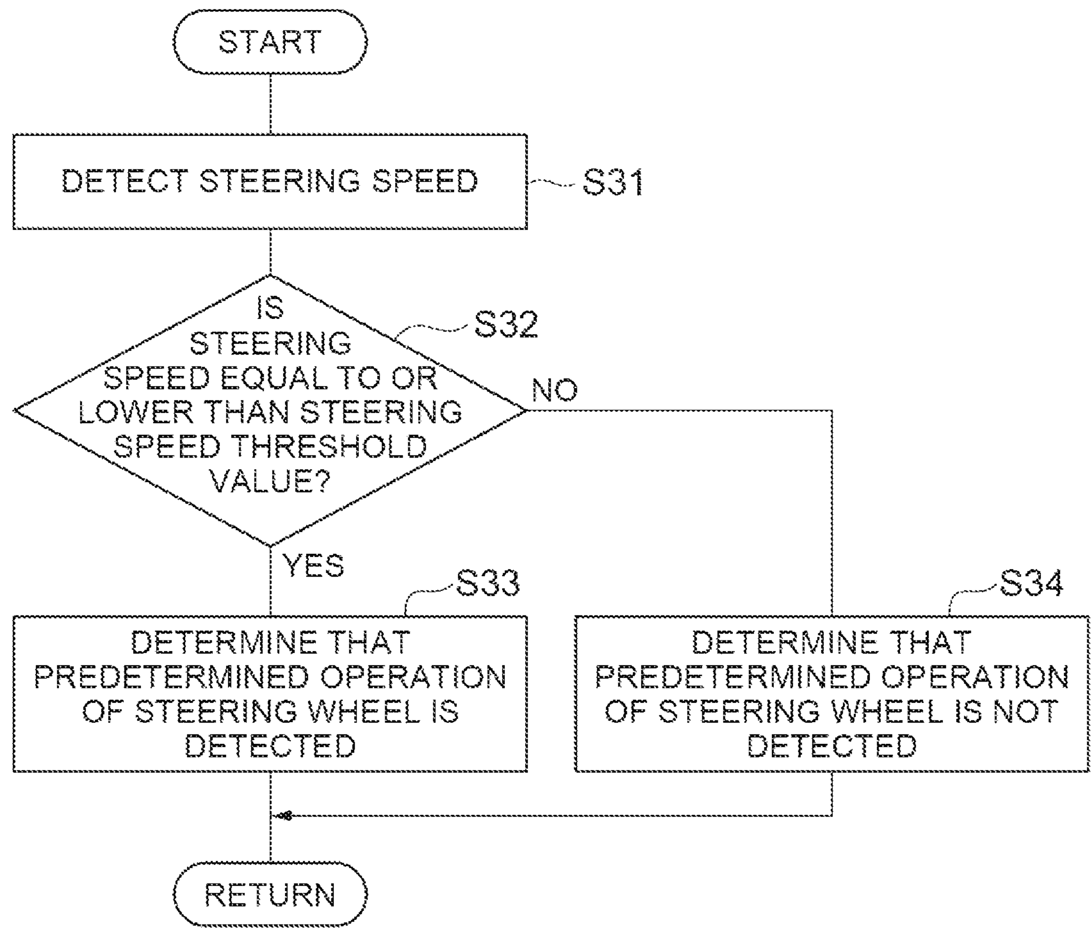
FIG. 15 is a flowchart exemplifying a steering operation detection process of FIG. 14.

FIG. 15 is a flowchart exemplifying the steering operation detection process of FIG. 14. As shown in FIG. 15, the controller 10B detects the steering speed of the steering wheel 33 by the steering hydraulic control unit 15B in S31. The steering hydraulic control unit 15B detects the steering speed of the steering wheel 33 based on the steering angle detected by the steering angle sensor 26.

In S32, the controller 10B determines whether or not the steering speed of the steering wheel 33 is equal to or lower than the predetermined steering speed threshold value (rotation speed threshold value) by the steering hydraulic control unit 15B. The controller 10B shifts the process to S33 when the steering speed of the steering wheel 33 is equal to or lower than the steering speed threshold value (S32=YES). In S33, the controller 10B determines that the predetermined operation of the steering wheel 33 is detected by the steering hydraulic control unit 15B. Then, the controller 10B ends the process of FIG. 15 and shifts the process to S22 of FIG. 14.

On the other hand, the controller 10B shifts the process to S34 when the steering speed of the steering wheel 33 exceeds the steering speed threshold value (S32=NO). In S34, the controller 10B determines that the predetermined operation of the steering wheel 33 is not detected by the steering hydraulic control unit 15B. Then, the controller 10B ends the process of FIG. 15 and shifts the process to S22 of FIG. 14.

Returning to FIG. 14, the controller 10B shifts the process to S23 when the steering hydraulic control unit 15B determines that the operation of the steering wheel 33 (here, the above-described predetermined operation) is detected (S22=YES) in S22. The controller 10B shifts the process to S24 when the steering hydraulic control unit 15B determines that the operation of the steering wheel 33 is not detected (S22=NO) in S22.

In S23, the controller 10B restricts the supply of the hydraulic oil to the steering cylinder 32 through the automatic steering circuit 50 by the steering hydraulic control unit 15B. In S23, the steering hydraulic control unit 15B controls the electromagnetic proportional valve 51 so that the hydraulic oil is not supplied from the hydraulic pump 31 to the steering cylinder 32 through the electromagnetic proportional valve 51 (for example, the spool 53 is neutralized). Alternatively, the steering hydraulic control unit 15B may control the unloading valve 52 so that the pressure of the hydraulic oil of the automatic steering circuit 50 is decreased (for example, the unloading valve 52 is opened) in S23. Accordingly, the supply of the hydraulic oil to the steering cylinder 32 through the automatic steering circuit 50 is restricted. Then, the controller 10B ends the process of FIG. 14. The controller 10B may repeat the process of FIG. 14 after a predetermined calculation period.

In S24, the controller 10B does not restrict the supply of the hydraulic oil to the steering cylinder 32 through the automatic steering circuit 50 by the steering hydraulic control unit 15B. In S24, the steering hydraulic control unit 15B controls the electromagnetic proportional valve 51 so that the hydraulic oil can be supplied from the hydraulic pump 31 to the steering cylinder 32 through the electromagnetic proportional valve 51 (for example, the movement from the neutral state of the spool 53 is allowed). Further, the steering hydraulic control unit 15B controls the unloading valve 52 so that the pressure of the hydraulic oil of the automatic steering circuit 50 is not decreased (for example, the unloading valve 52 is closed) in S24. Accordingly, the supply of the hydraulic oil to the steering cylinder 32 through the automatic steering circuit 50 is not restricted. Then, the controller 10B ends the process of FIG. 14. The controller 10B may repeat the process of FIG. 14 after a predetermined calculation period.

Operation and Effect of Second Embodiment

In the steering apparatus 100B for the industrial vehicle, the priority valve 60 supplies the hydraulic oil to the automatic steering circuit 50 at the second flow rate when there is an excess flow rate even when the steering wheel 33 is operated. The supply of the hydraulic oil to the steering cylinder 32 through the automatic steering circuit 50 is restricted by the supply restricting means when the steering operation detection unit detects the operation of the steering wheel 33. Accordingly, when the steering wheel 33 is operated, the operation of the steering cylinder 32 by the hydraulic oil supplied to the automatic steering circuit 50 is restricted. Thus, according to the steering apparatus 100B for the industrial vehicle, it is possible to suppress the hydraulic oil supplied through the automatic steering circuit 50 from affecting the operation of the steering cylinder 32 according to the operation of the steering wheel 33. In other words, it is possible to suppress the steering of the steered wheel by the operation of the steering wheel 33 from being hindered by the hydraulic oil on the automatic steering side and to suppress the response to the manual operation from becoming worse (becoming less efficient).

In the steering apparatus 100B for the industrial vehicle, the supply restricting means includes the controller 10B which controls the electromagnetic proportional valve 51 so that the hydraulic oil is not supplied from the hydraulic pump 31 to the steering cylinder 32 through the electromagnetic proportional valve 51 when the steering hydraulic control unit 15B detects the operation of the steering wheel 33. Accordingly, it is possible to restrict the operation of the steering cylinder 32 due to the hydraulic oil supplied to the automatic steering circuit 50 by interrupting the hydraulic oil by the electromagnetic proportional valve 51 when the steering wheel 33 is operated.

In the steering apparatus 100B for the industrial vehicle, the supply restricting means includes the unloading valve 52 which is provided to be capable of decreasing the pressure of the hydraulic oil of the automatic steering circuit 50 and the controller 10B which controls the unloading valve 52 to decrease the pressure of the hydraulic oil of the automatic steering circuit 50 when the steering hydraulic control unit 15B detects the operation of the steering wheel 33. Accordingly, it is possible to restrict the operation of the steering cylinder 32 due to the hydraulic oil supplied to the automatic steering circuit 50 by decreasing the pressure of the hydraulic oil of the automatic steering circuit 50 using the unloading valve 52 when the steering wheel 33 is operated.

In the steering apparatus 100B for the industrial vehicle, the operation of the steering wheel 33 is a predetermined operation of the steering wheel 33 by the operator of the industrial vehicle 1B. The steering hydraulic control unit 15B detects the predetermined operation when the steering speed of the steering wheel 33 is equal to or lower than the predetermined steering speed threshold value. Since the flow rate of the hydraulic oil to the steering cylinder 32 through the manual steering circuit 40 decreases as the rotation speed of the steering wheel 33 becomes slow when the steering wheel 33 is operated, the excess flow rate is likely to occur. Therefore, since the supply of the hydraulic oil to the steering cylinder 32 through the automatic steering circuit 50 is restricted by detecting the predetermined operation when the steering speed of the steering wheel 33 is equal to or lower than the steering speed threshold value, it is possible to suppress the hydraulic oil supplied through the automatic steering circuit 50 from affecting the operation of the steering cylinder 32 according to the operation of the steering wheel 33.

Modified Example of Second Embodiment

As described above, the second embodiment according to the present disclosure has been described, but the present disclosure is not limited to the above-described second embodiment.

The supply restricting means is not limited to the unloading valve 52, the electromagnetic proportional valve 51, and the controller 10B described above. For example, as the restriction by the supply restricting means, the controller 10B may control the rotation speed of the (constant displacement) hydraulic pump 31. The controller 10B can restrict the supply of the hydraulic oil to the steering cylinder 32 through the automatic steering circuit 50 by decreasing the rotation speed of the hydraulic pump 31 to decrease the excess flow rate when the steering hydraulic control unit 15B detects the operation of the steering wheel 33.

Alternatively, as another modified example of the supply restricting means, the hydraulic pump 31 may be a variable displacement pump configured to be capable of changing the hydraulic oil discharge amount during operation. The controller 10B may control the variable displacement pump to decrease the hydraulic oil discharge amount when the steering hydraulic control unit 15B detects the operation of the steering wheel 33. In this case, since the discharge amount during the operation of the variable displacement pump is controlled as the restriction by the supply restricting means, it is possible to restrict the supply of the hydraulic oil to the steering cylinder 32 through the automatic steering circuit 50 by decreasing the excess flow rate when the steering hydraulic control unit 15B detects the operation of the steering wheel 33.

In the above-described second embodiment, the operation of the steering wheel 33 is detected by the steering hydraulic control unit 15B on the condition that the automatic operation control is executed, but may be detected other than the condition that the automatic operation control is executed. Even in this case, for example, in a situation in which there is an excess pressure in the hydraulic oil through the automatic steering circuit 50 immediately after the automatic operation control is changed from the execution to the non-execution, it is possible to improve the response to the operation of the steering cylinder 32 according to the operation of the steering wheel 33 (improve efficiency) by decreasing the pressure of the hydraulic oil of the automatic steering circuit 50 by the unloading valve 52.

The controller 10B may omit the control of closing the electromagnetic proportional valve 51 when the unloading valve 52 is controlled so that the hydraulic oil is returned to the tank 34 through the return circuit 30*d*. Alternatively, in contrast, at least the controller 10B may restrict the supply of the hydraulic oil to the steering cylinder 32 through the automatic steering circuit 50 by controlling the electromagnetic proportional valve 51 to be closed. In this case, in the steering apparatus 100B for the industrial vehicle, the unloading valve 52 may be omitted.

OTHER MODIFIED EXAMPLES

In the above-described first and second embodiments, the electric towing tractors shown in FIGS. 1 and 9 are exemplified as the industrial vehicles 1A and 1B, but the present disclosure is not limited thereto. The industrial vehicles 1A and 1B may be other industrial vehicles such as forklifts.

The configuration for the automatic operation of the industrial vehicles 1A and 1B is not limited to the examples of the first and second embodiments. For example, the lidar is used as the surrounding condition sensor 22, but another sensor may be used instead.

At least a part of the first and second embodiments and various modified examples described above may be combined arbitrarily.

REFERENCE SIGNS LIST

1A, 1B: industrial vehicle, 10A, 10B: controller (control unit, supply restricting means), 11: map information acquisition unit, 12: position information acquisition unit, 13: travel information acquisition unit, 14: automatic operation control unit, 15A, 15B: steering hydraulic control unit (steering operation detection unit), 25: changeover switch (switch), 26: steering angle sensor (steering operation detection unit), 30: steering hydraulic circuit (hydraulic circuit), 31: hydraulic pump, 32: steering cylinder, 33: steering wheel, 40: manual steering circuit, 41: PS valve (first valve), 50: automatic steering circuit, 51: electromagnetic proportional valve (second valve, supply restricting means), 52: unloading valve (supply restricting means), 60: priority valve, 100A, 100B: steering apparatus for industrial vehicle.

The invention claimed is:

1. A steering apparatus for an industrial vehicle including a hydraulic pump discharging hydraulic oil and a steering cylinder operated by the hydraulic oil supplied thereto to steer a steered wheel, the steering apparatus for the industrial vehicle comprising:

a manual steering circuit which includes a first valve opened or closed according to an operation of a steering wheel and supplies the hydraulic oil discharged from the hydraulic pump to the steering cylinder through the first valve;

an automatic steering circuit which includes a second valve opened or closed according to a calculation result of automatic operation control and supplies the hydraulic oil discharged from the hydraulic pump to the steering cylinder through the second valve;

a branching valve which is disposed between the hydraulic pump and the first and second valves and branches the hydraulic oil to the manual steering circuit and the automatic steering circuit, wherein the branching valve is a priority valve which preferentially supplies the hydraulic oil to the manual steering circuit at a designed flow rate equal to or larger than a predetermined flow rate for operating the steering cylinder; and unloading means for decreasing a pressure of the hydraulic oil supplied from the hydraulic pump and applied to the second valve compared to a case in which a predetermined automatic steering non-operation condition for suspending the supply of the hydraulic oil through the second valve is not satisfied, when the automatic steering non-operation condition is satisfied.

2. The steering apparatus for the industrial vehicle according to claim 1, wherein the unloading means includes a control unit configured to determine whether or not the automatic steering non-operation condition is satisfied based on execution or non-execution information of the automatic operation control, or vehicle speed information of the industrial vehicle, and an unloading valve which is provided to be capable of decreasing the pressure of the hydraulic oil supplied from the hydraulic pump and applied to the second valve based on a determination result of the control unit, and wherein the control unit is configured to control the unloading valve to decrease the pressure of the hydraulic oil supplied from the hydraulic pump and applied to the second valve when it is determined that the automatic steering non-operation condition is satisfied.

3. The steering apparatus for the industrial vehicle according to claim 1, wherein the unloading means includes a control unit configured to determine whether or not the automatic steering non-operation condition is satisfied based on execution or non-execution information of the automatic operation control, or vehicle speed information of the industrial vehicle, and a variable displacement pump which is the hydraulic pump configured to be capable of changing a hydraulic oil discharge amount during operation based on a determination result of the control unit, and wherein the control unit is configured to control the variable displacement pump to decrease the hydraulic oil discharge amount when it is determined that the automatic steering non-operation condition is satisfied.

4. The steering apparatus for the industrial vehicle according to claim 2, wherein the control unit is configured to determine that the automatic steering non-operation condition is satisfied, when the state of a switch for switching the execution or non-execution of the automatic operation control is the automatic operation control non-execution state, based on a signal from the switch.

5. The steering apparatus for the industrial vehicle according to claim 2, wherein the control unit is configured to determine whether or not the industrial vehicle has been stopped continuously for a predetermined time, based on vehicle speed information of the industrial vehicle, and determines that the automatic steering non-operation condition is satisfied, when it is determined that the industrial vehicle has been stopped continuously for a predetermined time.

6. A steering apparatus for an industrial vehicle including a hydraulic pump discharging hydraulic oil and a steering cylinder operated by the hydraulic oil supplied thereto to steer a steered wheel, the steering apparatus for the industrial vehicle comprising:

a manual steering circuit which includes a first valve opened or closed according to an operation of a steering wheel and supplies the hydraulic oil discharged from the hydraulic pump to the steering cylinder through the first valve;

an automatic steering circuit which includes a second valve opened or closed according to a calculation result of automatic operation control and supplies the hydraulic oil discharged from the hydraulic pump to the steering cylinder through the second valve;

a branching valve which is disposed between the hydraulic pump and the first and second valves and branches the hydraulic oil to the manual steering circuit and the automatic steering circuit; and a steering operation detection unit configured to detect the operation of the steering wheel, wherein the branching valve is a priority valve which preferentially supplies the hydraulic oil to the manual steering circuit at a first flow rate equal to or larger than a predetermined flow rate for operating the steering cylinder in the hydraulic oil discharged from the hydraulic pump, and supplies the hydraulic oil to the automatic steering circuit at a second flow rate which is an excess flow rate excluding the first flow rate in the hydraulic oil discharged from the hydraulic pump, and wherein the steering apparatus further comprises supply restricting means for restricting the supply of the hydraulic oil to the steering cylinder through the automatic steering circuit when the steering operation detection unit detects the operation of the steering wheel.

7. The steering apparatus for the industrial vehicle according to claim 6, wherein the supply restricting means includes a control unit configured to control the second valve so that the hydraulic oil from the hydraulic pump is not supplied to the steering cylinder through the second valve when the steering operation detection unit detects the operation of the steering wheel.

8. The steering apparatus for the industrial vehicle according to claim 6, wherein the supply restricting means includes an unloading valve which is provided to be capable of decreasing a pressure of the hydraulic oil of the automatic steering circuit, and a control unit configured to control the unloading valve to decrease the pressure of the hydraulic oil of the automatic steering circuit, when the steering operation detection unit detects the operation of the steering wheel.

9. The steering apparatus for the industrial vehicle according to claim 6, wherein the operation of the steering wheel is a predetermined operation of the steering wheel by an operator of the industrial vehicle, and wherein the steering operation detection unit detects the predetermined operation when a rotation speed of the steering wheel is equal to or lower than a predetermined rotation speed threshold value.

* * * * *